(12) United States Patent
Sharp et al.

(10) Patent No.: US 8,282,539 B2
(45) Date of Patent: Oct. 9, 2012

(54) MULTI-LAYERED BAGS AND METHODS OF MANUFACTURING THE SAME

(75) Inventors: Stuart Sharp, Greer, SC (US); Allyson Smith, Columbia, SC (US); George Solomon, Spartanburg, SC (US)

(73) Assignee: Exopack, LLC, Spartanburg, SC (US)

( * ) Notice: Subject to any disclaimer, the term of this patent is extended or adjusted under 35 U.S.C. 154(b) by 756 days.

(21) Appl. No.: 12/341,080

(22) Filed: Dec. 22, 2008

(65) Prior Publication Data

US 2010/0158417 A1 Jun. 24, 2010

(51) Int. Cl.
*B31B 1/90* (2006.01)
*B32B 1/08* (2006.01)

(52) U.S. Cl. ....... 493/212; 493/186; 493/933; 428/34.3; 428/36.91

(58) Field of Classification Search ............. 493/186, 493/189, 193, 212, 213, 214, 927, 933; 428/34.1, 428/34.3, 34.6, 34.7, 35.2, 35.7, 36.9, 36.91
See application file for complete search history.

(56) References Cited

U.S. PATENT DOCUMENTS

| | | |
|---|---|---|
| 2,870,954 A | 1/1959 | Kulesza |
| 2,997,224 A | 8/1961 | Stannard |
| 3,567,111 A | 3/1971 | Baxter |
| 3,570,748 A | 3/1971 | Coyle et al. |
| 3,628,720 A | 12/1971 | Schmedding |
| 3,687,356 A | 8/1972 | Goodrich et al. |
| 3,784,085 A * | 1/1974 | Kilgore .................. 383/113 |
| 3,900,670 A | 8/1975 | Ikeda et al. |
| 3,910,488 A | 10/1975 | Goodrich |
| 3,924,013 A | 12/1975 | Kane |
| 3,927,825 A | 12/1975 | Stearley |
| 3,939,025 A | 2/1976 | Kane |
| 3,966,115 A | 6/1976 | Hollis |
| 3,967,998 A | 7/1976 | Kane |
| 4,008,850 A | 2/1977 | Goodrich |
| 4,088,264 A | 5/1978 | Vogt |
| 4,096,309 A | 6/1978 | Stillman |
| 4,147,291 A | 4/1979 | Akao et al. |
| 4,387,126 A | 6/1983 | Rebholz |
| 4,493,127 A | 1/1985 | Blanke, Jr. et al. |
| 4,515,273 A | 5/1985 | Jacobson et al. |
| 4,521,910 A | 6/1985 | Keppel et al. |
| 4,705,707 A | 11/1987 | Winter |

(Continued)

FOREIGN PATENT DOCUMENTS

DE 0148436 5/1981

(Continued)

OTHER PUBLICATIONS

Notice of Publication dated Dec. 31, 2009 for U.S. Appl. No. 12/556,151.

(Continued)

*Primary Examiner* — Paul R Durand
(74) *Attorney, Agent, or Firm* — Stoel Rives LLP

(57) ABSTRACT

A bag can include walls formed of a material having multiple layers, which can include two polyolefin layers and a paper layer. The bag can be formed into a sewn-open-mouth configuration in which a stitching element extends through a wall of the bag. The bag can include a grease-resistant seal that substantially prevents grease from escaping from the bag via an opening in the wall through which the stitching element extends.

31 Claims, 30 Drawing Sheets

U.S. PATENT DOCUMENTS

| | | |
|---|---|---|
| 4,716,061 A | 12/1987 | Winter |
| 4,743,123 A | 5/1988 | Legters et al. |
| 4,753,832 A | 6/1988 | Brown et al. |
| 4,797,010 A | 1/1989 | Coelho |
| 4,806,398 A | 2/1989 | Martin |
| 4,808,421 A | 2/1989 | Mendenhall et al. |
| 4,894,264 A | 1/1990 | Akao et al. |
| 4,904,093 A | 2/1990 | Woods et al. |
| 4,930,906 A * | 6/1990 | Hemphill ........................ 383/89 |
| 4,946,289 A | 8/1990 | Bolling et al. |
| 4,949,529 A | 8/1990 | Davis |
| 4,952,441 A | 8/1990 | Bose et al. |
| 4,971,454 A | 11/1990 | Branson et al. |
| 4,994,324 A | 2/1991 | Bose et al. |
| 5,007,233 A | 4/1991 | Bose |
| 5,038,009 A | 8/1991 | Babbitt |
| 5,051,284 A | 9/1991 | Johansson et al. |
| 5,073,421 A | 12/1991 | Akao |
| 5,091,228 A | 2/1992 | Fujii et al. |
| 5,097,956 A | 3/1992 | Davis |
| 5,108,807 A | 4/1992 | Tucker |
| 5,171,594 A | 12/1992 | Babbitt |
| 5,225,256 A | 7/1993 | Marano et al. |
| 5,244,702 A | 9/1993 | Finestone et al. |
| 5,273,361 A | 12/1993 | Jillson |
| 5,281,027 A | 1/1994 | Thrall |
| 5,302,427 A | 4/1994 | Murschall et al. |
| 5,310,587 A | 5/1994 | Akahori et al. |
| 5,330,845 A * | 7/1994 | Andersson et al. ........... 428/487 |
| 5,332,586 A | 7/1994 | Di Mino |
| 5,342,662 A | 8/1994 | Aoyama et al. |
| 5,345,399 A | 9/1994 | Collins |
| 5,376,392 A | 12/1994 | Ikegami et al. |
| 5,399,022 A | 3/1995 | Sheets |
| 5,405,663 A | 4/1995 | Archibald et al. |
| 5,415,910 A | 5/1995 | Knauf |
| 5,470,594 A | 11/1995 | Di Mino |
| 5,482,376 A | 1/1996 | Mosely et al. |
| 5,488,220 A | 1/1996 | Freeks et al. |
| 5,512,338 A | 4/1996 | Bianchini et al. |
| 5,520,464 A | 5/1996 | Kristola |
| 5,520,970 A * | 5/1996 | Christensson et al. ....... 428/34.2 |
| 5,529,396 A | 6/1996 | Pryor et al. |
| 5,536,542 A | 7/1996 | Gillespie et al. |
| 5,553,942 A | 9/1996 | Domke et al. |
| 5,558,438 A | 9/1996 | Warr |
| 5,560,296 A | 10/1996 | Adams |
| 5,560,945 A | 10/1996 | Geddes et al. |
| 5,593,229 A | 1/1997 | Warr |
| 5,601,369 A | 2/1997 | Mosely et al. |
| 5,604,042 A * | 2/1997 | Bianchini et al. .............. 428/507 |
| 5,611,626 A | 3/1997 | Warr |
| 5,659,933 A | 8/1997 | McWilliams |
| 5,728,037 A | 3/1998 | Pryor et al. |
| 5,770,839 A | 6/1998 | Ruebush et al. |
| 5,814,382 A | 9/1998 | Yannuzzi, Jr. |
| 5,823,933 A * | 10/1998 | Yeager ........................... 493/213 |
| 5,830,548 A | 11/1998 | Andersen et al. |
| 5,851,608 A * | 12/1998 | Yamada et al. ............... 428/34.2 |
| 5,871,790 A | 2/1999 | Monier et al. |
| 5,876,815 A * | 3/1999 | Sandstrom et al. ........... 428/36.8 |
| RE36,177 E | 4/1999 | Rouyer et al. |
| 5,902,046 A | 5/1999 | Shibata |
| 5,912,070 A | 6/1999 | Miharu et al. |
| 6,003,670 A | 12/1999 | Beer |
| 6,019,713 A | 2/2000 | Scypinski et al. |
| 6,046,443 A | 4/2000 | Ackerman et al. |
| 6,065,871 A | 5/2000 | Warr |
| 6,071,576 A | 6/2000 | Bentmar et al. |
| 6,137,098 A | 10/2000 | Moseley et al. |
| 6,187,396 B1 | 2/2001 | Möller |
| 6,213,644 B1 | 4/2001 | Henderson et al. |
| 6,231,232 B1 | 5/2001 | Warr |
| 6,248,442 B1 | 6/2001 | Kong et al. |
| 6,251,489 B1 | 6/2001 | Weiss et al. |
| 6,277,547 B1 | 8/2001 | Bourdelais et al. |
| 6,299,351 B1 | 10/2001 | Warr |
| 6,333,086 B1 | 12/2001 | Ora et al. |
| 6,346,332 B1 | 2/2002 | Bryden et al. |
| 6,367,976 B1 | 4/2002 | Bannister |
| 6,372,317 B1 | 4/2002 | Denney et al. |
| 6,374,461 B1 | 4/2002 | Gober et al. |
| 6,375,981 B1 | 4/2002 | Gilleland et al. |
| 6,402,379 B1 | 6/2002 | Albright |
| 6,436,547 B1 | 8/2002 | Toft et al. |
| 6,479,137 B1 | 11/2002 | Joyner |
| 6,500,505 B2 | 12/2002 | Piper et al. |
| 6,509,105 B2 | 1/2003 | Olvey |
| 6,528,088 B1 | 3/2003 | Gilleland et al. |
| 6,534,137 B1 | 3/2003 | Vadhar |
| 6,565,936 B1 | 5/2003 | Peiffer et al. |
| 6,576,304 B2 | 6/2003 | Yamada et al. |
| 6,579,580 B1 | 6/2003 | Yamada et al. |
| 6,589,384 B2 | 7/2003 | Chen et al. |
| 6,609,999 B2 | 8/2003 | Albright |
| 6,623,162 B2 | 9/2003 | Pang |
| 6,652,984 B2 | 11/2003 | Finestone et al. |
| 6,673,465 B2 | 1/2004 | Lordi |
| 6,715,919 B2 | 4/2004 | Hiraiwa et al. |
| 6,746,736 B2 | 6/2004 | Leeper et al. |
| 6,767,600 B1 | 7/2004 | Kasahara |
| 6,797,395 B2 | 9/2004 | Finestone et al. |
| 6,855,387 B2 * | 2/2005 | Yamada et al. ............... 428/34.2 |
| 6,858,313 B2 | 2/2005 | Musco et al. |
| 6,883,964 B2 | 4/2005 | Beaulieu |
| 6,887,538 B2 | 5/2005 | Denney et al. |
| 6,893,686 B2 | 5/2005 | Egan |
| 6,899,460 B2 | 5/2005 | Turvey et al. |
| 6,919,111 B2 | 7/2005 | Swoboda et al. |
| 6,921,563 B2 | 7/2005 | Goerlitz et al. |
| 6,926,951 B2 | 8/2005 | Huffer et al. |
| 6,926,968 B2 * | 8/2005 | Lordi ........................ 428/537.5 |
| 6,964,797 B2 * | 11/2005 | Salste et al. .................. 428/34.2 |
| 6,974,612 B1 | 12/2005 | Frisk et al. |
| 7,090,904 B2 | 8/2006 | Hartzell et al. |
| 7,147,913 B2 | 12/2006 | Iwasaki et al. |
| 7,157,126 B2 | 1/2007 | Cosentino et al. |
| 7,364,361 B2 | 4/2008 | Turvey et al. |
| 7,459,214 B2 | 12/2008 | Olofsson et al. |
| 7,476,441 B2 | 1/2009 | Iwasaki et al. |
| 2003/0044552 A1 | 3/2003 | Komada |
| 2003/0077007 A1 | 4/2003 | Turvey et al. |
| 2003/0229168 A1 | 12/2003 | Borsinger et al. |
| 2004/0038792 A1 | 2/2004 | Albright |
| 2004/0052987 A1 | 3/2004 | Shetty et al. |
| 2004/0069157 A1 * | 4/2004 | Lin ................................. 99/451 |
| 2004/0091648 A1 | 5/2004 | Hartzell et al. |
| 2004/0105600 A1 | 6/2004 | Floyd, Jr. |
| 2004/0105942 A1 | 6/2004 | Cable |
| 2004/0136616 A1 | 7/2004 | Allen et al. |
| 2004/0137206 A1 | 7/2004 | Pettis |
| 2004/0175060 A1 | 9/2004 | Woodham et al. |
| 2004/0191438 A1 | 9/2004 | Cosentino et al. |
| 2004/0217112 A1 | 11/2004 | Monforton et al. |
| 2004/0228547 A1 | 11/2004 | Hartzell et al. |
| 2005/0008736 A1 | 1/2005 | Egan et al. |
| 2005/0084185 A1 * | 4/2005 | Moon .......................... 383/116 |
| 2005/0100252 A1 | 5/2005 | Rivlin et al. |
| 2005/0112305 A1 | 5/2005 | Swoboda et al. |
| 2005/0191399 A1 | 9/2005 | Jackson et al. |
| 2005/0230384 A1 | 10/2005 | Robinson et al. |
| 2006/0073292 A1 | 4/2006 | Hartzell et al. |
| 2007/0042146 A1 | 2/2007 | Sharp |
| 2007/0047852 A1 | 3/2007 | Sharp et al. |
| 2007/0047853 A1 | 3/2007 | Sharp et al. |
| 2007/0110932 A1 | 5/2007 | Castillo et al. |
| 2008/0044546 A1 | 2/2008 | Jensen et al. |
| 2008/0070047 A1 | 3/2008 | Rehkugler et al. |
| 2008/0078759 A1 | 4/2008 | Wnek et al. |
| 2008/0166457 A1 | 7/2008 | Gorman et al. |
| 2008/0268106 A1 | 10/2008 | Jackson et al. |
| 2009/0324143 A1 | 12/2009 | Sharp et al. |
| 2010/0150479 A1 | 6/2010 | Smith |
| 2010/0158417 A1 | 6/2010 | Sharp et al. |

FOREIGN PATENT DOCUMENTS

| | | |
|---|---|---|
| EP | 0822063 | 2/1998 |
| FR | 2256660 | 7/1975 |
| FR | 2847232 | 11/2002 |
| FR | 2847232 | 5/2004 |
| GB | 1462941 | 1/1977 |
| GB | 2351039 | 12/2000 |
| NL | 6806715 | 7/1968 |
| WO | WO 00/53429 | 9/2000 |
| WO | WO 01/94451 | 12/2001 |
| WO | WO 03064167 | 8/2003 |
| WO | WO 2007/027423 | 3/2007 |
| WO | WO 2011/031353 | 3/2011 |

OTHER PUBLICATIONS

Office Action dated Jan. 5, 2010 for U.S. Appl. No. 11/240,944.
Office Action dated Jan. 5, 2010 for U.S. Appl. No. 11/214,419.
Office Action dated Jan. 5, 2010 for U.S. Appl. No. 11/214,434.
Notification of Transmittal of the International Search Report and the Written Opinion of the International Searching Authority mailed Dec. 17, 2010 in International Application No. PCT/US2010/036435.
Graphic Packaging International, Graphic Packaging Expands Microrite® Line with New Oil-Absorbent Sleeve for Beckers in Europe (Nov. 30, 2005), available at http://phx.corporate-ir.net/phoenix.zhtml?c=103159&p=irol-newsArticle&ID=791279&highlight=.
"While Bags Take a Beating from China, Bemis Offers a New Poly/Plastic Hybrid Solution," Packaging Strategies, vol. 26, No. 16, p. 4 (Sep. 15, 2008).
"Mulilayer Kraft Paper Bag for Food Products," DD-148-436, 1 page (May 1981).
Notification of Transmittal of the International Search Report and the Written Opinion of the International Searching Authority issued Mar. 18, 2008 in International Application No. PCT/US06/031690.
Requirement for Restriction/Election dated Apr. 21, 2008 in co-pending U.S. Appl. No. 11/240,944.
Response to the Restriction/Election dated May 21, 2008 in co-pending U.S. Appl. No. 11/240,944.
Office Action dated Jul. 24, 2008 in co-pending U.S. Appl. No. 11/240,944.
Response to the Office Action dated Nov. 24, 2008 in co-pending U.S. Appl. No. 11/240,944.
Terminal Disclaimers and 3,73(b) Statement dated Nov. 24, 2008 in co-pending U.S. Appl. No. 11/240,944.
Office Action dated Feb. 6, 2009 in co-pending U.S. Appl. No. 11/240,944.
Examiner Interview Summary dated Mar. 12, 2009 in co-pending U.S. Appl. No. 11/240,944.
Request for Continued Examination submitted with a Response to the Office Action and a Rule 131 Declaration dated May 6, 2009 in co-pending U.S. Appl. No. 11/240,944.
Office Action dated Jul. 21, 2009 in co-pending U.S. Appl. No. 11/240,944.
Draft Claims for an In-Person Interview dated Oct. 5, 2009 in co-pending U.S. Appl. No. 11/240,944.
Response to the Office Action with an Appendix dated Oct. 21, 2009 in co-pending U.S. Appl. No. 11/240,944.
Examiner Interview Summary dated Oct. 22, 2009 in co-pending U.S. Appl. No. 11/240,944.
Requirement for Restriction/Election dated May 12, 2008 in co-pending U.S. Appl. No. 11/214,419.
Response to the Requirement for Restriction/Election dated Jun. 12, 2008 in co-pending U.S. Appl. No. 11/214,419.
Office Action dated Jul. 21, 2008 in co-pending U.S. Appl. No. 11/214,419.
Response to the Office Action dated Nov. 21, 2008 in co-pending U.S. Appl. No. 11/214,419.
Terminal Disclaimers and 3.73(b) Statement dated Nov. 21, 2008 in co-pending U.S. Appl. No. 11/214,419.
Office Action dated Feb. 10, 2009 in co-pending U.S. Appl. No. 11/214,419.
Examiner Interview Summary dated Mar. 12, 2009 in co-pending U.S. Appl. No. 11/214,419.
Request for Continued Examination submitted with a Response to the Office Action and a Rule 131 Declaration dated May 7, 2009 in co-pending U.S. Appl. No. 11/214,419.
Office Action dated Jul. 21, 2009 in co-pending U.S. Appl. No. 11/214,419.
Draft Claims for an In-Person Interview dated Oct. 5, 2009 in co-pending U.S. Appl. No. 11/214,419.
Response to the Office Action with an Appendix dated Oct. 21, 2009 in co-pending U.S. Appl. No. 11/214,419.
Examiner Interview Summary dated Oct. 21, 2009 in co-pending U.S. Appl. No. 11/214,419.
Office Action dated Jul. 22, 2008 in co-pending U.S. Appl. No. 11/214,434.
Response to the Office Action dated Nov. 24, 2008 in co-pending U.S. Appl. No. 11/214,434.
Terminal Disclaimers and 3.73(b) Statement dated Nov. 24, 2008 in co-pending U.S. Appl. No. 11/214,434.
Office Action dated Feb. 5, 2009 in co-pending U.S. Appl. No. 11/214,434.
Request for Continued Examination submitted with a Response to the Office Action and a Rule 131 Declaration dated May 4, 2009 in co-pending U.S. Appl. No. 11/214,434.
Office Action dated Jul. 23, 2009 in co-pending U.S. Appl. No. 11/214,434.
Draft Claims for an In-Person Interview dated Oct. 5, 2009 in co-pending U.S. Appl. No. 11/214,434.
Response to the Office Action with an Appendix dated Oct. 21, 2009 in co-pending U.S. Appl. No. 11/214,434.
Examiner Interview Summary dated Oct. 21, 2009 in co-pending U.S. Appl. No. 11/214,434.
Co-pending U.S. Appl. No. 12/335,414, titled Multi-Layer Bags and Methods of Manufacturing the Same, filed Dec. 15, 2008.
Co-pending U.S. Appl. No. 12/556,151, titled Bags Having Composite Structures and Related Methods, filed Sep. 9, 2009.
European Search Report dated Oct. 23, 2009.
Bentley, David J., Jr., "About Cold Seal Adhesives", Paper Film and foil Converter, 2 pgs., Jan. 2006.
Smith, Nancy, "Cold Seal Adhesives", Rhom & Haas Company, Aimcal Conference, 6 pgs, 6 pgs., 2005.
Food Packaging Technology, ed. Coles, et al., CRC Press, 2003.
Notice of Abandonment mailed Aug. 17, 2010 in U.S. Appl. No. 11/240,944, now abandoned.
Notice of Abandonment mailed Aug. 17, 2010 in U.S. Appl. No. 11/214,419, now abandoned.
Notice of Abandonment mailed Aug. 17, 2010 in U.S. Appl. No. 11/214,434, now abandoned.
Office Action mailed Aug. 31, 2011 in co-pending U.S. Appl. No. 12/335,414, now published as US 2010/0150479.
Amendment and Response to Office Action filed Feb. 29, 2012 in co-pending U.S. Appl. No. 12/335,414, now published as US 2010/0150479.
Restriction Requirement mailed Dec. 21, 2011 in co-pending U.S. Appl. No. 12/556,151, now published as US 2010/0324143.

* cited by examiner

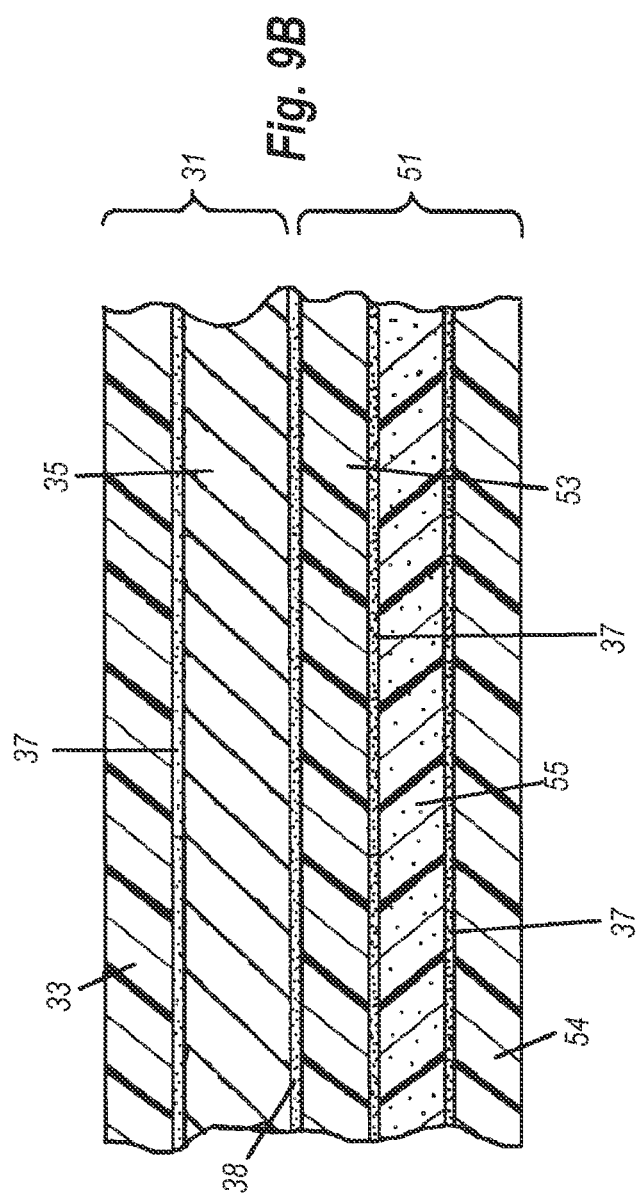
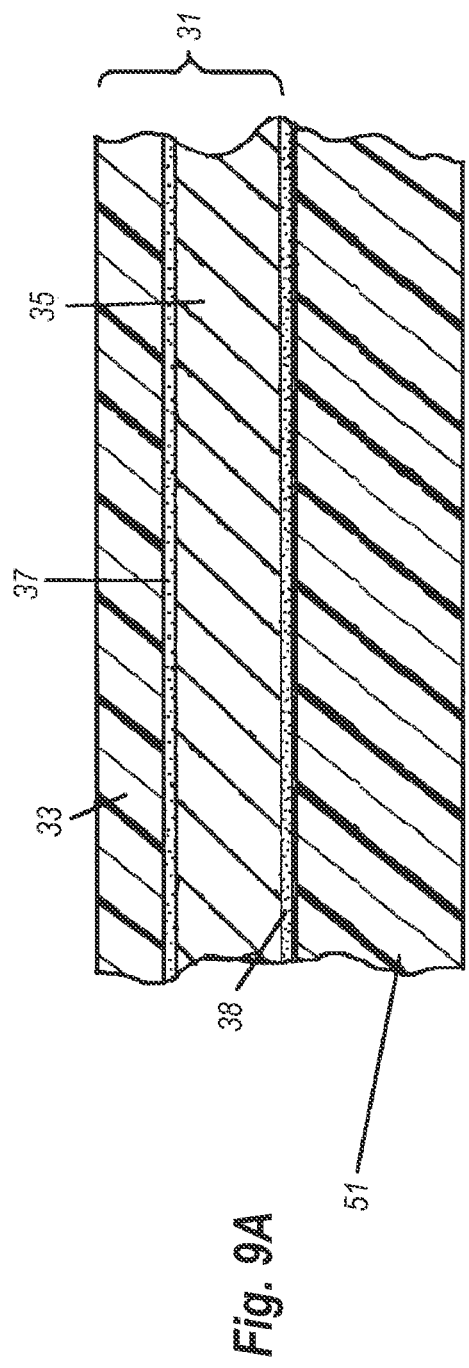

TABLE 1

| Construction | % Increase MD Tensile Stiffness | % Increase CD Tensile Stiffness |
|---|---|---|
| 48 gauge PET, CSR4 Paper, and 2.5 mil. FT 2510 coextruded film v. PET | 1066.9% | 572.8% |
| 48 gauge PET, CSR4 Paper, and 2.5 mil. FT 2510 coextruded film v. 2.5 mil. FT 2510 coextruded film | 3369.5% | 2004.3% |
| 48 gauge PET, Advantage One Paper, and 2.5 mil. FT 2510 coextruded film v. PET | 644.9% | 769.3% |
| 48 gauge PET, Advantage One Paper, and 2.5 mil. FT 2510 coextruded film v. 2.5 mil. FT 2510 coextruded film | 2114.6% | 2618.8% |

Fig. 21

TABLE 2

| Construction | % Increase Dull Puncture | % Increase Sharp Puncture |
|---|---|---|
| 48 gauge PET v. Paper | 98.3% | 27.9% |
| 48 gauge PET and 2.5 mil. FT 2510 coextruded film v. Paper | 116.6% | 166.0% |

Fig. 22

TABLE 3

| Construction | % Increase MD Tear Resistance | % Increase CD Tear Resistance | % Increase MD Tear Initiation | % Increase CD Tear Initiation |
|---|---|---|---|---|
| 48 gauge PET v. Paper | 24.8% | 10.5% | 76.2% | 68.3% |
| 48 gauge PET and 2.5 mil. FT 2510 coextruded film v. Paper | 237.1% | 174.1% | 108.8% | 60.2% |

Fig. 23

TABLE 4

| Construction | Dull Puncture Resistance, g | Sharp Puncture Resistance, g | MD Tear Resistance, g | CD Tear Resistance, g | MD Tear Initiation, g | CD Tear Initiation, g | MD Tensile, lb/in | MD % Stretch | MD TEA, ft lb/ sq ft | MD Tensile Stiffness, lbf/in | CD Tensile, lb/in | CD % S | CD TEA, ft lb/sq ft | CD Tensile Stiffness, lb/in |
|---|---|---|---|---|---|---|---|---|---|---|---|---|---|---|
| CSR4 | 1403 | 276 | 41.8 | 58.1 | 556.5 | 631.3 | 26.5 | 2.1 | 3.9 | 1949 | 23 | 5.3 | 9.5 | 1171 |
| MWK | 1830 | 395 | 77.2 | 93.3 | 892.6 | 685.9 | 29.2 | 1.6 | 3.3 | 2431 | 15.5 | 3.3 | 4.4 | 1235 |
| Trial BL Non CC | 1572 | 255 | 31.7 | 41.4 | 1131.6 | 862.9 | 37.5 | 2.5 | 7 | 2860 | 15.5 | 3.7 | 4.9 | 1180 |
| W-RPSE | 3751 | 441 | 91.5 | 100.0 | 1050.7 | 946.5 | 32.9 | 5.4 | 13.3 | 1539 | 26 | 7.8 | 15.8 | 882 |
| Ad One | 6425 | 767 | 172.5 | 207.8 | 1627.8 | 1758.9 | 45.9 | 9.1 | 29.1 | 1292.1 | 33.5 | 5.2 | 14.8 | 2204 |
| 65# BL MWK | 2230 | 378 | 98.5 | 101.9 | 1634.0 | 1683.5 | 40.8 | 1.9 | 5.8 | 3021 | 19.4 | 3.9 | 6.6 | 1502 |
| 48 ga PET | 4713 | | | | | | 15 | 92.1 | | 199.5 | 14.8 | 89 | | 215.8 |
| 2.5 mil PT 2510 | 2818 | | | | | | 12.7 | 462.7 | 67.1 | | 14.9 | 599.1 | | 69 |
| PET/CSR4 | 4143 | 285 | 70.3 | 55.8 | 1670.3 | 1692.1 | 35.2 | 2.2 | 5.8 | 2405 | 31.3 | 6.2 | 15.8 | 1396 |
| PET/MWK | 3721 | 427 | 85.8 | 102.6 | 1326.8 | 1088 | 37.2 | 1.8 | 4.6 | 2709 | 25.4 | 4.2 | 9.2 | 1654 |
| PET/Trial BL | 3164 | 349 | 46.3 | 51.5 | 1134.4 | 805.3 | 45.1 | 2.5 | 8.2 | 2896 | 23.6 | 4.4 | 9.3 | 1512 |
| PET/Trial BL | 3038 | 334 | 46.1 | 56.6 | 1379.5 | 779.2 | 45.2 | 2.6 | 8.5 | 2839 | 24.7 | 4.8 | 10.4 | 1497 |
| PET/Ad One | 8249 | 830 | 188.3 | 201.6 | 2968.2 | 3051.7 | 58.9 | 9.5 | 39.2 | 1548 | 45.4 | 6.6 | 24.7 | 2058 |
| PET/M-RPSE | 4764 | 843 | 103.4 | 122 | 3000.5 | 1886.4 | 43.4 | 5.9 | 19.8 | 1840 | 37.5 | 8.6 | 26.5 | 1307 |
| PET/CSR4/2510 CTM | 4317 | 1003 | 194.1 | 200.4 | 1553.9 | 1235.7 | 39.7 | 2.5 | 7 | 2320 | 30 | 7.1 | 20.7 | 1452 |
| PET/Ad One/2510 CTM | 8064 | 1293 | 362 | 422.5 | 2237.9 | 2192.9 | 62.3 | 10.3 | 46.6 | 1436 | 55.7 | 8.3 | 36.7 | 1876 |
| PET / 65# BL MWK | 4673 | 625 | 100 | 118.9 | 2283.8 | 2011.4 | 49.6 | 2.3 | 7.8 | 3139 | 30.2 | 5.9 | 15.1 | 1799 |

Fig. 24

TABLE 5

| Finished Product | Basis Weight, lb/3000 sq ft | Dull Probe Puncture Resistance, g (out-in) | MD Tear Resistance, g | CD Tear Resistance, g | MD Tear Initiation, g | CD Tear Initiation, g | MD Tensile, lb/in | MD % Stretch | CD Tensile, lb/in | CD % Stretch | MD Taber Stiffness | CD Taber Stiffness |
|---|---|---|---|---|---|---|---|---|---|---|---|---|
| Typical Pet Food Bag | 140 | 4300 | 85 | 95 | 2300 | 2100 | 29 | 1.9 | 13 | 4.1 | 4.9 | 3.3 |
| Outer Ply Failure-Current | 140 | 1400 | 40 | 60 | 560 | 630 | | | | | | |
| Composite Bag | 110 | 6600 | 3300 | 4600 | 2200 | 1800 | 43 | 6 | 24 | 11 | 3.7 | 5.7 |
| Typical 100% Poly Bag | | 8400 | 600 | 600 | 2100 | 1900 | 27 | 80 | 27 | 55 | 2.7 | 2.9 |
| Typical WPP SOM Bag | 90 | 17800 | Does Not Tear | Does Not Tear | 4160 | 4300 | Cannot Test | Cannot Test | Cannot Test | Cannot Test | 3.5 | 4.6 |

Fig. 25

TABLE 6

| Finished Product | # Drops Before Failure (20 Pounds of Contents) | # Drops Before Failure (52 Pounds of Contents) |
|---|---|---|
| Typical Pet Food Bag - Pinch Construction - Outer Ply Failure- Current | >18 | 5 |
| Composite Bag - Pinch Construction | >18 | 7.5 |
| Typical Pet Food Bag - SOM Construction - Outer Ply Failure- Current | - | 3 |
| Typical WPP Bag- SOM Construction | - | 9.2 |
| Composite Bag - SOM Construction | - | 9.2 |

Fig. 26

MULTI-LAYERED BAGS AND METHODS OF MANUFACTURING THE SAME

TECHNICAL FIELD

Embodiments disclosed herein relate generally to bags that can be used in the packaging industry, and more particularly to grease-resistant bags and methods for manufacturing the same.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 9A illustrates a partial cross-sectional view of an embodiment of a material compatible with the bag of FIG. 1;

FIG. 9B illustrates a partial cross-sectional view of the material of FIG. 8 taken along the view line 9B-9B in FIG. 8;

FIG. 21 illustrates a table comparing various properties of various materials, at least some of which are compatible with embodiments of a grease-resistant bag;

FIG. 22 illustrates a table comparing various properties of various materials, at least some of which are compatible with embodiments of a grease-resistant bag;

FIG. 23 illustrates a table comparing various properties of various materials, at least some of which are compatible with embodiments of a grease-resistant bag;

FIG. 24 illustrates a table comparing various properties of various materials, at least some of which are compatible with embodiments of a grease-resistant bag; and FIG. 25 illustrates a table comparing various properties of various bags; and FIG. 26 illustrates a table comparing the results of drop tests performed on various bags.

DETAILED DESCRIPTION

Embodiments of a bag are disclosed. In many embodiments, the bag can comprise multiple layers. Each layer can provide the bag with one or more desirable characteristics, depending on the application of the bag. In certain embodiments, the bag can comprise a paper layer, which can contribute to the stiffness of the bag and can aid in manufacturing the bag using standard converting equipment. In some embodiments, the bag is formed into a sewn-open-mouth configuration, and can comprise one or more polyolefin layers. In some embodiments, the one or more polyolefin layers can provide the bag with grease-resistant properties, even at positions in the bag through which a stitching element has been inserted through walls of the bag. Such embodiments, as well as others, are disclosed in greater detail.

Figure 1:
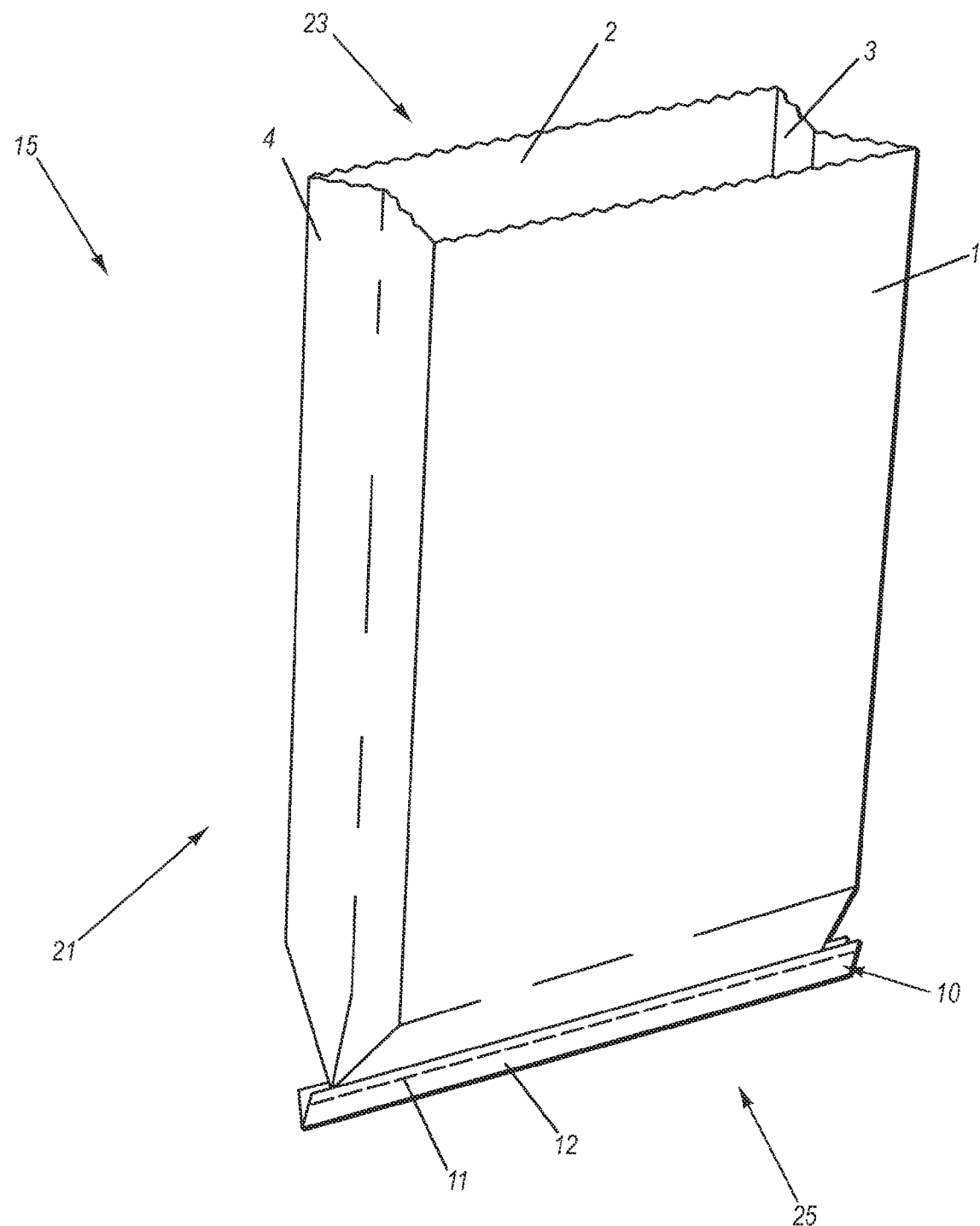
FIG. 1 illustrates a perspective view of an embodiment of a bag having a sewn end and an open end.

FIG. 1 illustrates a perspective view of an embodiment of a bag 15. The bag 15 can include a body portion 21, which can be substantially tubular in form. For example, in some embodiments, the body portion 21 defines a front wall 1, a back wall 2, a first side wall 3, and a second side wall 4. In certain embodiments, the bag 15 defines a sewn-open-mouth configuration, and can include a closure seam 10 at a bottom end 25 of the body portion 21. In some embodiments, the seam 10 comprises one or more stitching elements 11, such as threads, strings, or yarns, that extend through the front wall 1 and the back wall 2 in a sewn or stitching pattern. In some embodiments, the one or more stitching elements 11 can further extend through end portions of the first side wall 3 and/or the second side wall 4. In some embodiments, a closure strip 12, which can comprise paper or any other suitable material, is positioned over (e.g., at an outwardly facing surface of) the front wall 1 and the back wall 2 and is sewn to the front and back walls 1, 2 via the one or more stitching elements 11. When the bag 15 is in a sewn-open-mouth configuration, a top end 23 of the bag 15 can be open such that a product can be received into the bag 15, and the product can be maintained within the bag 15 via the closed bottom end 25.

In some embodiments, the body portion 21 comprises a sheet of material that is folded or otherwise formed into the substantially tubular structure. As further discussed below, the material can comprise multiple layers, each of which can provide or aid in providing desirable functional characteristics to the bag 15.

Figure 2:
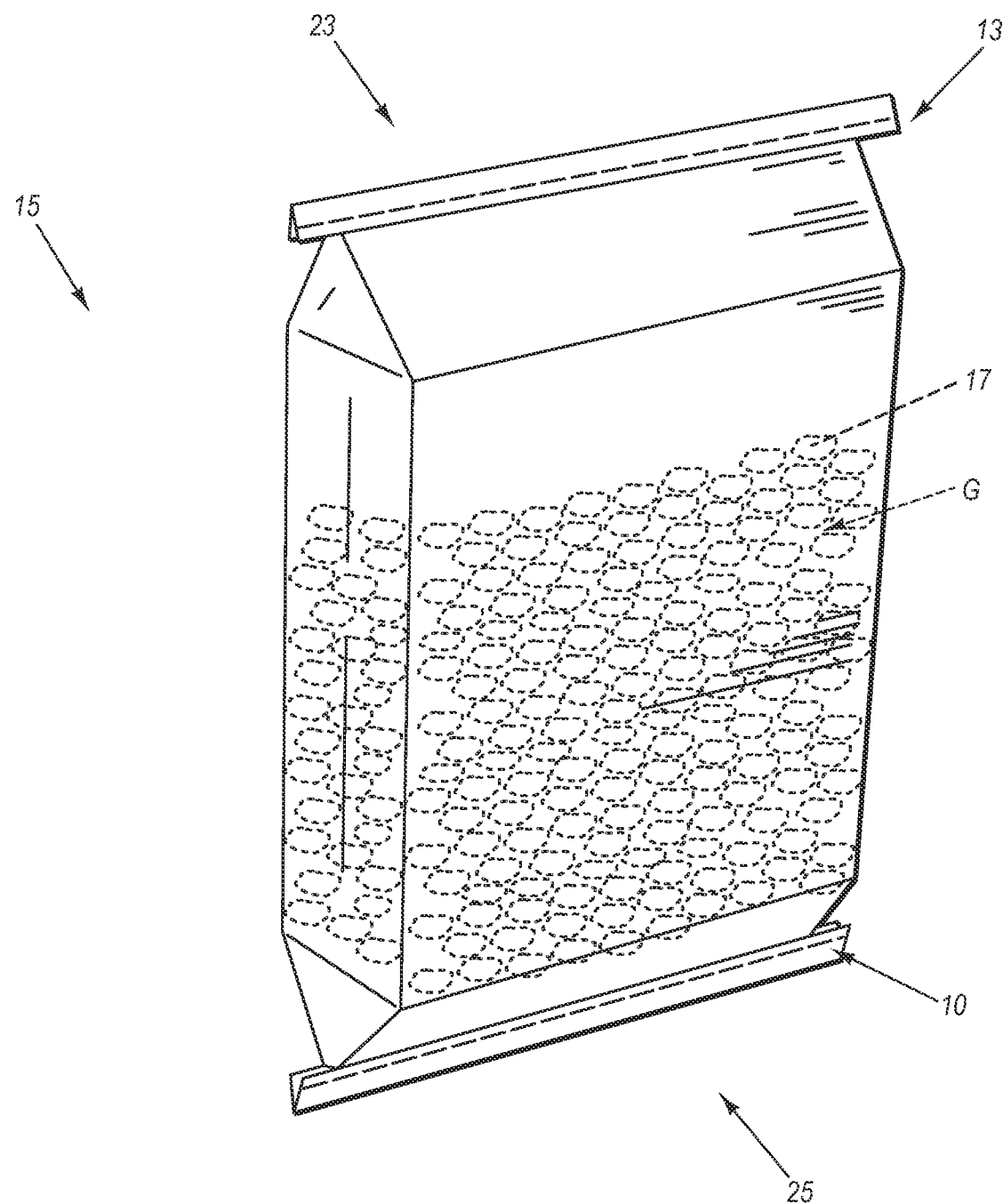
FIG. 2 illustrates a perspective view of the bag of FIG. 1 having a product disposed therein and two sewn ends.

With reference to FIG. 2, in certain embodiments, the bag 15 can have contents disposed therein, such as a product 17. In some embodiments, the product 17 includes a grease component G. Once the product 17 is within the bag 15, the top end 23 of the bag 15 can be closed in any suitable fashion. For example, the illustrated embodiment includes a closure seam 13 such as the closure seam 10 at the bottom end 25 of the bag 15 (discussed above).

Figure 3:
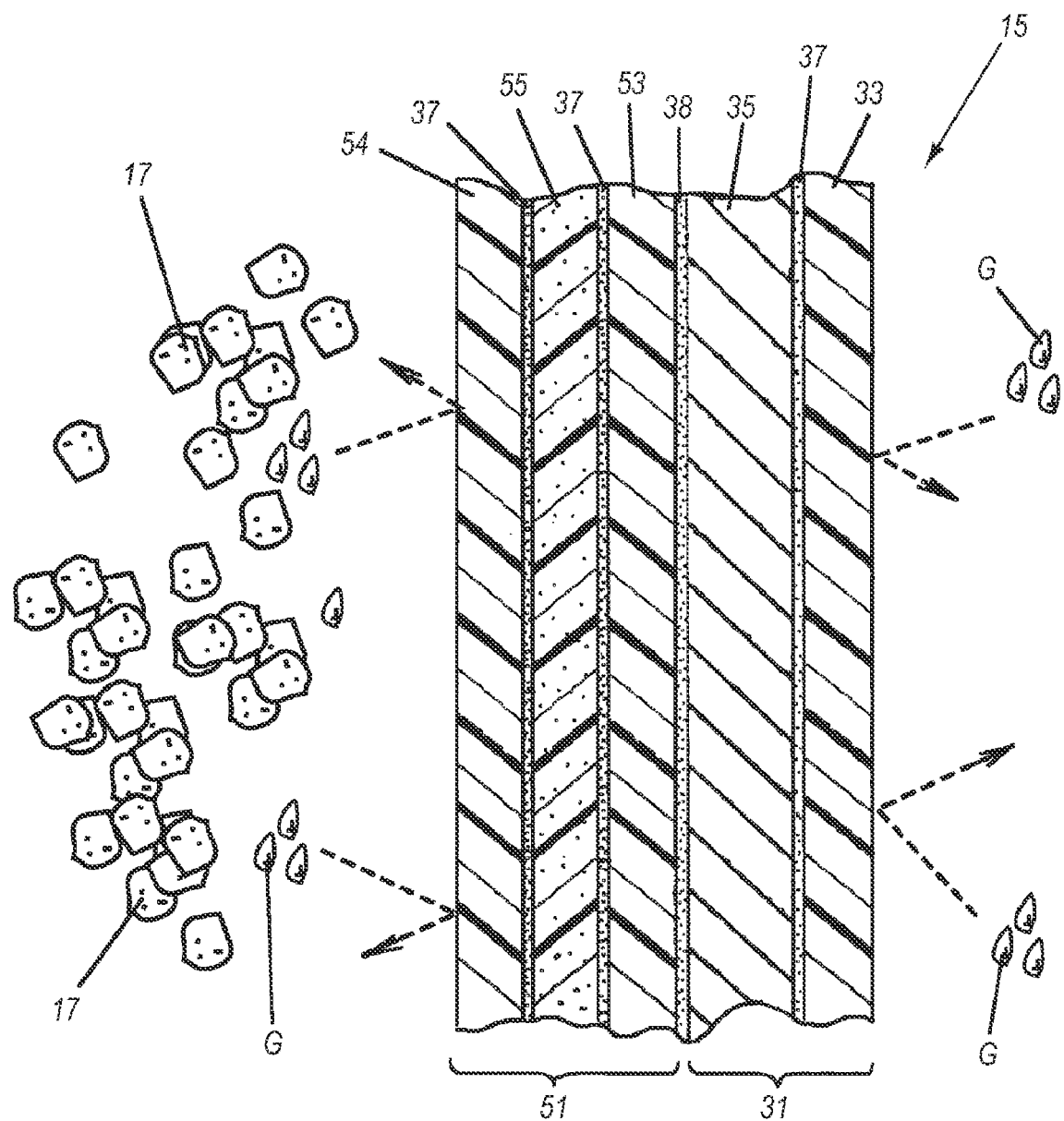
FIG. 3 illustrates grease-resistant properties of an embodiment of a material compatible with the bag of FIG. 1 that is shown in partial cross-section.

As schematically illustrated in FIG. 3, in some embodiments, the bag 15 can substantially prevent grease G from the product 17 from migrating or penetrating from within the bag 15 to a position outside the bag 15. In further embodiments, the bag 15 can prevent grease at a position outside of the bag 15 from migrating into or otherwise penetrating the bag 15. The bag 15 can also substantially block or serve as a barrier to elements other than grease, such as, for example, liquids or odors. These properties are described in further detail below.

With reference to FIGS. 3-8B, in certain embodiments, the material of which the body portion 21 of the bag 15 is formed can comprise an outer ply 31 and an inner ply 51. In some embodiments, an inner face (e.g., an inwardly facing surface) of the outer ply 31 is adhered to an outer face (e.g., an outwardly facing surface) of the inner ply 51. In further embodiments, the inner and outer plies 51, 31 can be in abutting contact. For example, the inner ply 51 can be laminated to the outer ply 31.

Figure 4A:
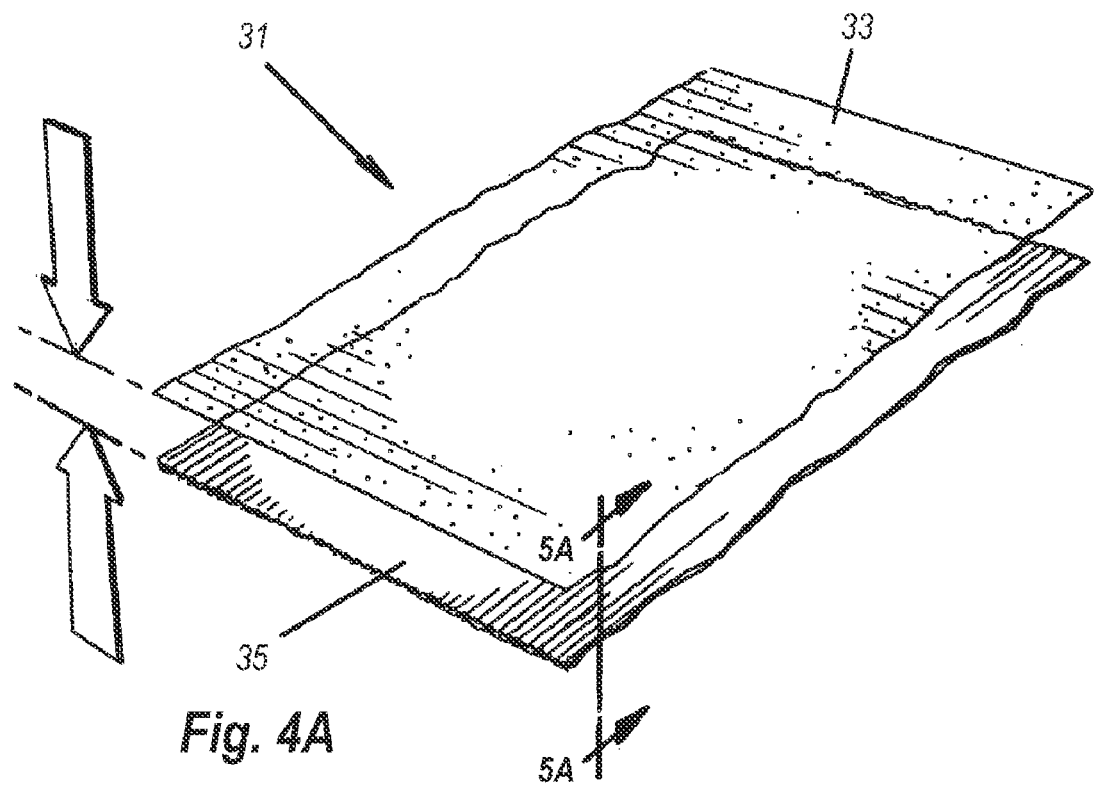
FIG. 4A illustrates a partial exploded view of an embodiment of an outer ply compatible with the bag of FIG. 1.
Figure 5A:
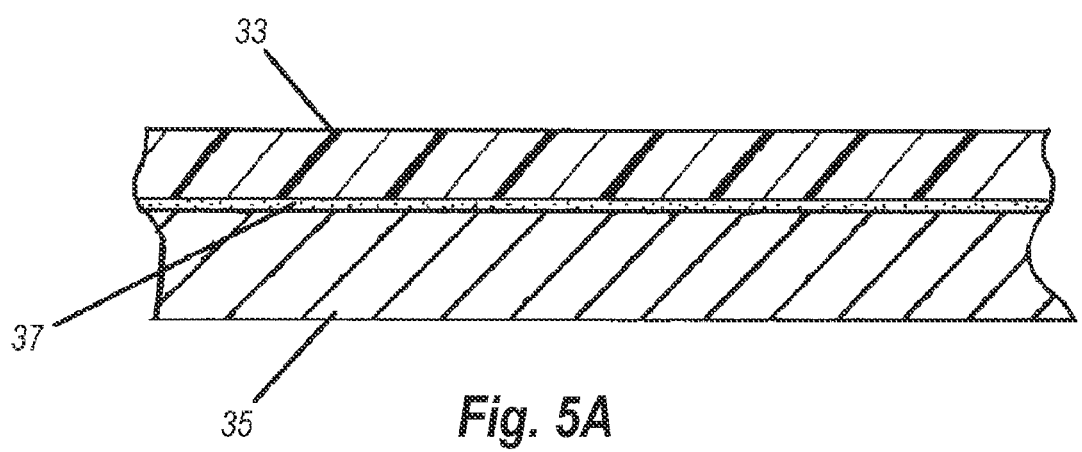
FIG. 5A illustrates a partial cross-sectional view of the outer ply of FIG. 4A taken along the view line 5A-5A in FIG. 4A.

With reference generally to FIGS. 3-5B, and more particularly to FIGS. 4A and 5A, in certain embodiments, the outer ply 31 can comprise a film 33 and a paper layer 35. The film 33 and the paper layer 35 can be joined in any suitable fashion. For example, the film 33 and the paper layer 35 can be laminated, such as via adhesive lamination or extrusion lamination. The film 33 can be adhered (e.g., in abutting contact) to an outer face of the paper layer 35 via a tie layer 37. In various embodiments, the tie layer 37 can comprise a solventless adhesive, a plastic-type bonding material, or a co-extruded film. In some embodiments, the tie layer 37 comprises polyurethane. Other suitable materials are possible for the tie layer 37. For example, solvent-based adhesives may be used.

Any suitable methods and equipment can be used to join the film 33 and the paper layer 35, including those known in the art and those yet to be devised. For example, an adhesive can be applied in a conventional manner on conventional equipment. In some embodiments, the adhesive can comprise a water-adhesive in a mixture, or can comprise a 100% solids glue. For example, in some embodiments, the adhesive can comprise a radiation-cured adhesive, a solventless adhesive, a solvent-based adhesive, or a water-based adhesive. In other embodiments, extrusion coating lamination may be used. For example, in some embodiments, an extrusion coating lamination comprises the use of a PE blend as the extrudate. In some embodiments, the lamination is performed via a separate piece of equipment designed for laminating and extruding. In other embodiments, an in-line tuber is used.

In certain embodiments, the film 33 comprises a polyolefin, and may comprise a thermoplastic material. For example, in various embodiments, the film 33 comprises polyethylene terephthalate (PET), polyethylene terephthalate polyester (PETP), polytrimethylene terephthalate (PTT), polybutylene terephthalate (PBT), or polypropylene (PP). In some instances, PTT and PBT may be more expensive than PET. Certain films 33, such as some embodiments that comprise polyester (e.g., PETP), can be puncture-resistant, tear-resistant, scratch-resistant, grease-resistant, and/or absorption-resistant. These properties can aid in providing a bag 15 with, and in maintaining, an aesthetically pleasing appearance.

In some embodiments, the film 33 can include one or more materials configured to provide or enhance the grease-resistance or other barrier properties of the film 33. For example, in some embodiments, the film 33 can be resistant to or substantially impermeable to mineral oils, solvents, and acids. The film 33 can include, for example, plastics, polyvinyl chloride (PVC), polyamide (PA), polyethylene (PE), polystyrene (PS), and/or polypropylene (PP).

In some embodiments, the film 33 can be in a range of from about 30 gauge to about 300 gauge. In other embodiments, the thickness can be in a range from about 36 gauge to about 48 gauge. For example, in certain pet food bag applications, the film 33 can be about 48 gauge. The film 33, however, can have other gauges for pet food bags, or for other applications, as needed or desired.

Figure 4B:
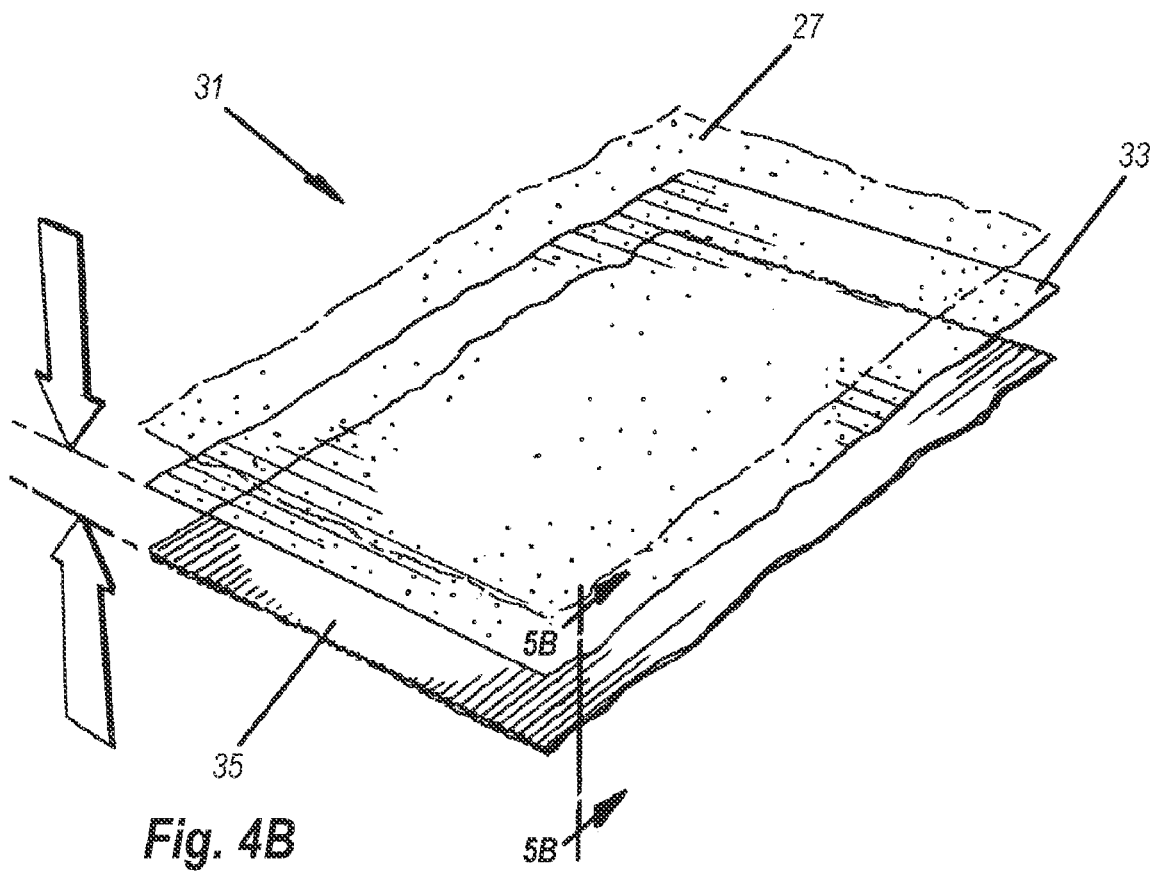
FIG. 4B illustrates a partial exploded view of another embodiment of an outer ply compatible with the bag of FIG. 1.
Figure 5B:
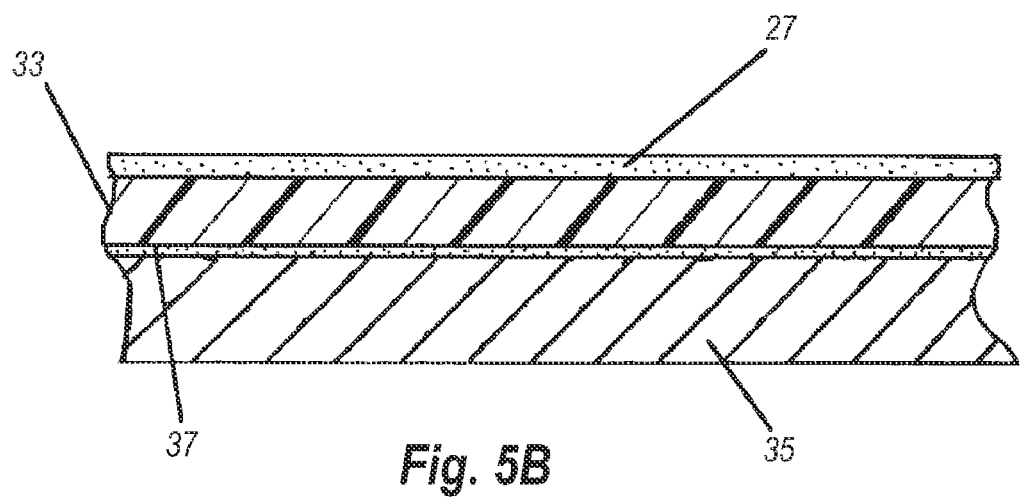
FIG. 5B illustrates a partial cross-sectional view of the outer ply of FIG. 4B taken along the view line 5B-5B in FIG. 4B.

With reference to FIGS. 4B and 5B, in certain embodiments, the film 33 can be treated with a coating 27 on the outer face thereof. The coating 27 can provide an enhanced barrier, and can inhibit or substantially prevent grease and/or moisture from penetrating the bag 15 from the outside. The coating 27 can protect against abrasion of the film 33, and may provide an aesthetically appealing gloss finish. In some embodiments, the coating 27 can facilitate adhesion and bonding and can increase a coefficient of friction of the bag 15. In some embodiments, the coating 27 can include printed indicia, which can be surface printed or reverse printed. In various embodiments, the coating 27 can comprise, for example, a flexography coating 27, a proprietary coating 27, or any other suitable coating 27. For example, in some embodiments, the coating 27 can comprise the proprietary coating Repellence™ barrier coating or Aqua Crystal™ film coating, each of which is manufactured by Exopack, LLC of Spartanburg, S.C.

In some embodiments, the coating 27 can provide oil, grease, and/or water resistance without the use of traditional films and/or foils, which can be inferior for various purposes. The coating 27 can effectively preserve the quality of the package contents as well as the physical integrity of the bag 15 as a whole. For example, in some embodiments, a coating 27 that comprises REPELLENCE™ can be used advantageously with products that contain oil or grease, or for bags 15 that may occasionally be subjected to rain or other elements. In some embodiments, a coating 27 that comprises Aqua Crystal™ can be relatively clear and glossy, thereby providing a bag 15 with an attractive appearance.

In still other embodiments, one or more additional polyolefin films 33 can be combined with the illustrated film 33. For example, an additional polyolefin film 33 can replace the coating 27, or in further embodiments, the additional polyolefin film can be joined with an outwardly facing surface of the illustrated film 33, and the coating 27 can be applied to an outwardly facing surface of the additional polyolefin film 33.

In certain embodiments, an outer face of the film 33 can have a coefficient of friction in a range of from about 0.5 to about 0.9. Other ranges and values are also possible. The coefficient of friction, for example, for certain pet food bag applications can be sufficiently large to inhibit slipping or sliding of a bag 15 when positioned on a shelf or cabinet.

Figure 4C:
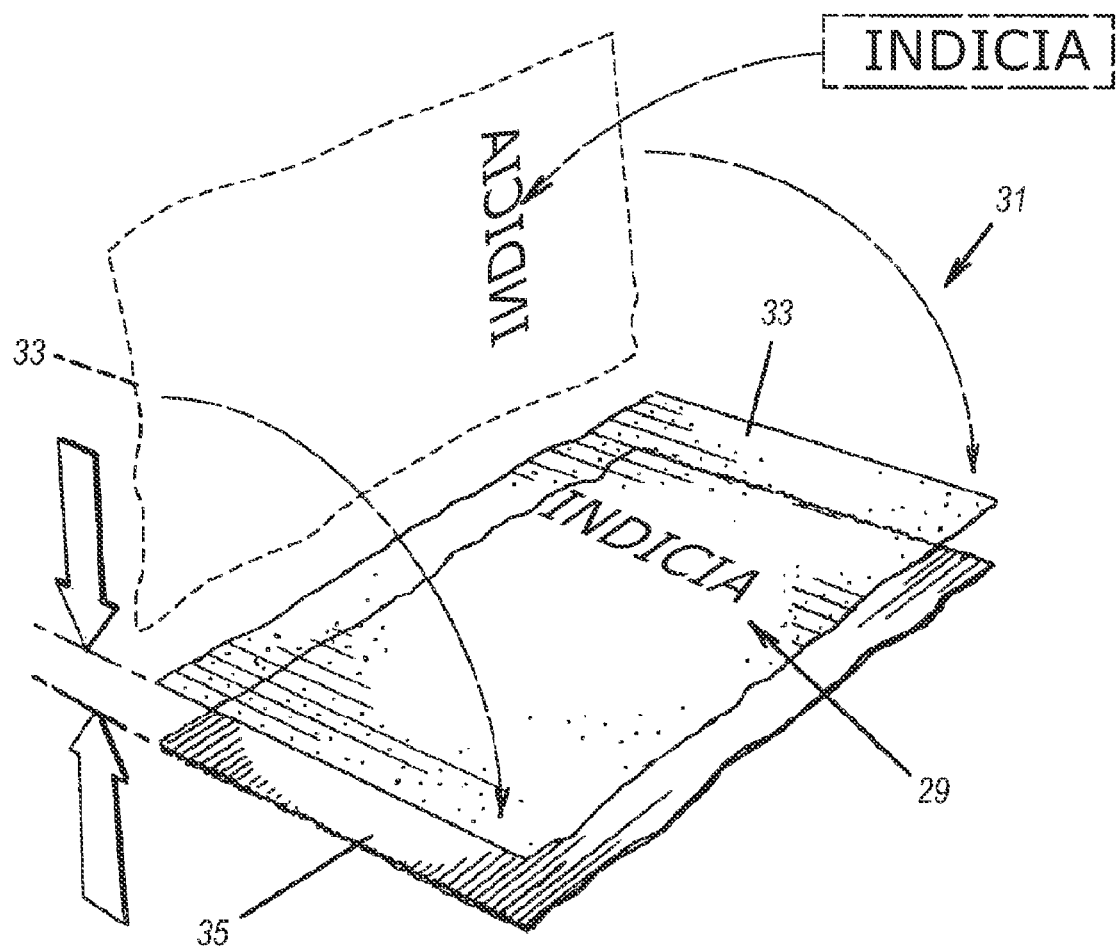
FIG. 4C illustrates a partial exploded view of another embodiment of an outer ply compatible with the bag of FIG. 1 in which a film portion of the outer ply is reverse printed.
Figure 6:
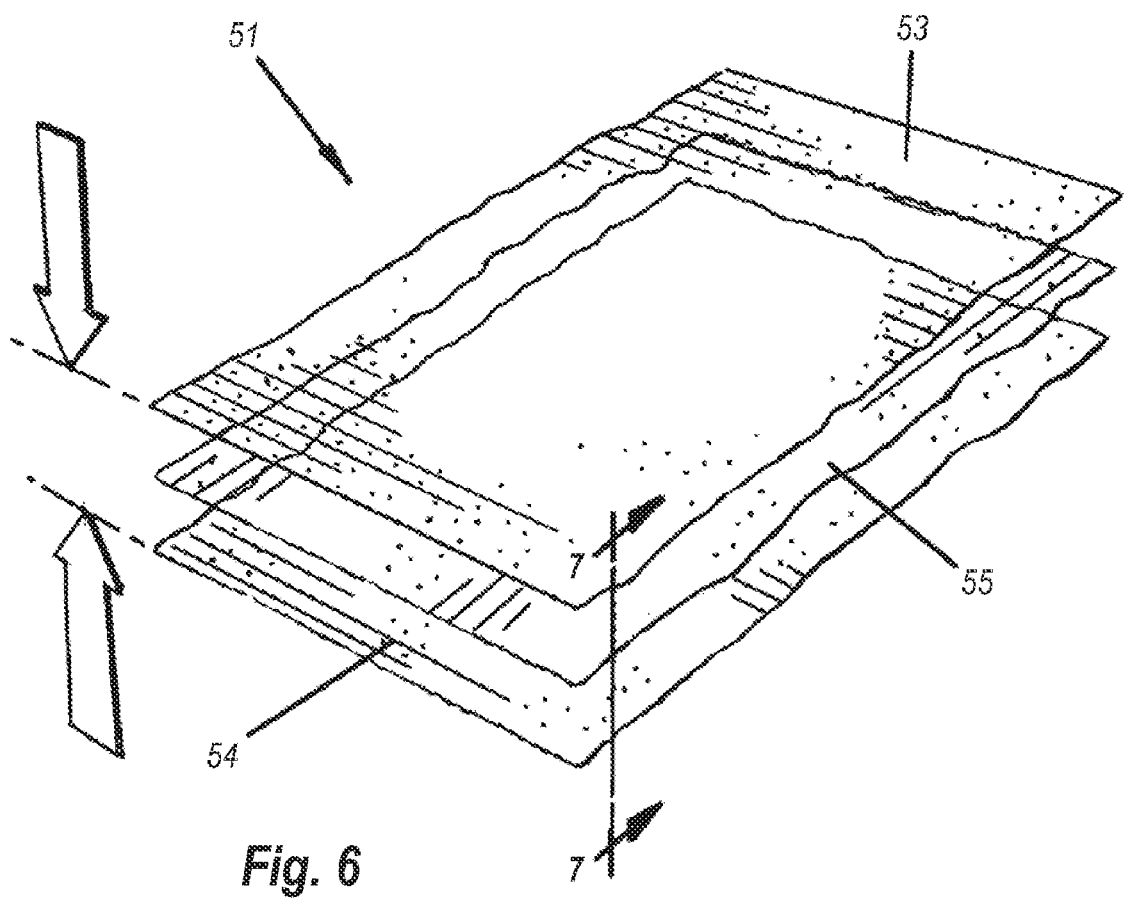
FIG. 6 illustrates a partial exploded view of an embodiment of an inner ply compatible with the bag of FIG. 1.
Figure 7:
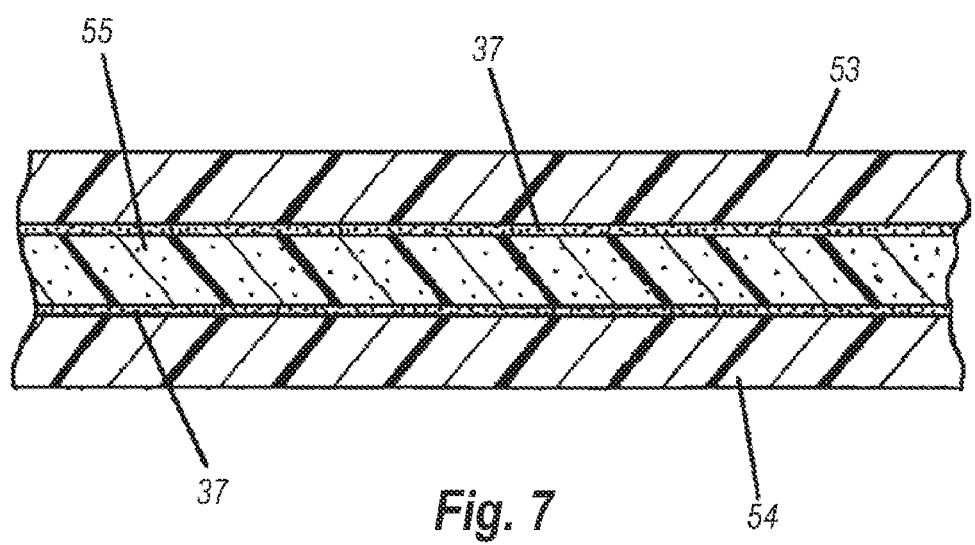
FIG. 7 illustrates a partial cross-sectional view of the inner ply of FIG. 6 taken along the view line 7-7 in FIG. 6.
Figure 8:
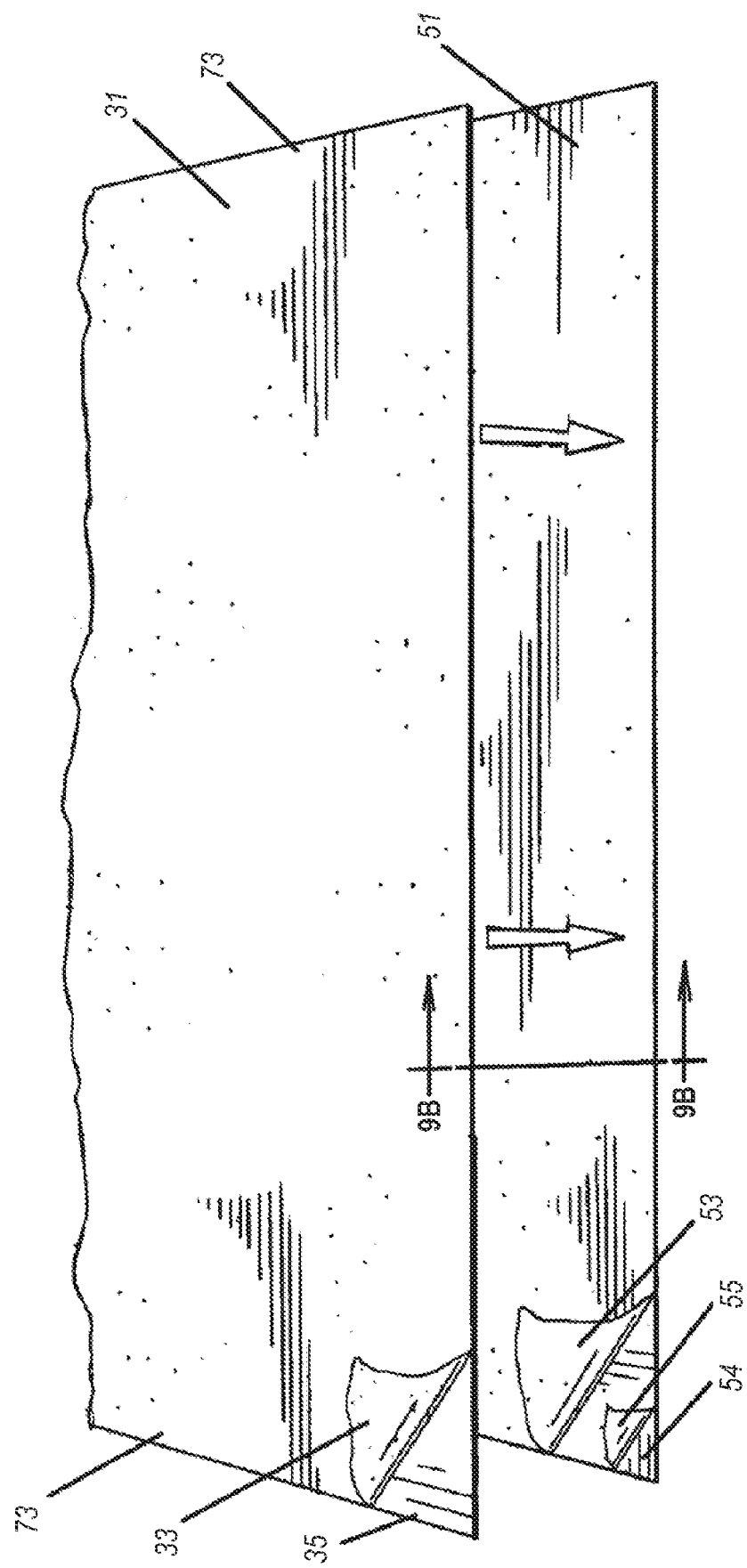
FIG. 8 illustrates a partial exploded view of an embodiment of a material having an embodiment of an inner ply and an embodiment of an outer ply and that is compatible with the bag of FIG. 1.

With reference to FIG. 4C, in some embodiments, an inner face of the film 33 of the outer ply 31 can include printed indicia 29, which can aid in the identification and/or advertisement of the contents of the bag, the distributor of the bag, etc. In some embodiments, the film 33 exhibits properties (e.g., clarity, shininess, scratch resistance, etc.) that can enhance visual appearance of the bag 15, as described above. The film 33 can be configured to transmit light such that the printed indicia 29 is visible at a position outside of the bag 15.

In certain embodiments, the film 33 can be amorphous, which is a classification indicating that the film 33 is highly transparent and colorless, or can be semi-crystalline, which is a classification indicating that the film 33 is translucent or opaque with an off-white coloring. In some cases, amorphous polyester films 33 can have better ductility than semi-crystalline polyesters, but can exhibit less hardness and stiffness than the semi-crystalline type. In some embodiments, a film 33 can be printed with solvent-based inks or water based inks, and can be printed overall with a flood coat of white ink, which may advantageously allow for high-quality graphics. Certain embodiments that include a flood coat of white ink may also advantageously mask grease that might penetrate through the film 33 (e.g., via a cut or crack in the film 33). In some embodiments, portions of the film 33 are treated with an acrylic chemical suitable for adhering to solvent based inks, water based inks, or other inks.

In certain embodiments, instead of reverse printing indicia 29 on the inner face of the film 33, indicia 29 can be surface printed on the outer face of the film 33. It is also possible to print indicia 29 on both the inner and outer faces of the film 33. In other embodiments, the film 33 can be unprinted (e.g., the film 33 can be substantially plain and/or clear). The film 33 can provide a bag 15 with a superior appearance, as compared with, for example, standard pet food bags. For example, a printing on the film 33 can be more aesthetically pleasing than similar printing applied to paper bags that do not have an outer film 33.

With reference again to FIGS. 3-5B generally, in certain embodiments, the paper layer 35 of the outer ply 31 can exhibit a bending stiffness, modulus, and/or tensile stiffness that is larger than that of the film 33. In further embodiments, the paper layer 35 can be thicker than the film 33. In some embodiments, the paper layer 35 can provide sufficient structural rigidity to permit the bag 15 to be placed in and remain in an upright position. For example, the bag 15 might contain a product 17 in an amount sufficient to fill only a fraction (e.g., ¼, ⅓) of the bag 15. In certain of such embodiments, the product 17 can be settled at the bottom end 25 of the bag 15, and the bag 15 can be set upright on its bottom end 25. Although the product 17 does not generally support the top end 23 of the bag 15 in such a configuration, the bag 15 can nevertheless remain in a substantially upright configuration, and can resist gravitational force acting on the top end 23 of the bag 15 due to the stiffness of the paper layer 35.

As used herein, the term stiffness is a broad term used in its ordinary sense, and can include bending stiffness or tensile stiffness. Other suitable measurements of stiffness can also be utilized, such as droop stiffness, folding endurance, or other alternative measurements. In certain instances, bending stiffness represents the rigidity of paper or paperboard. In some cases, the bending stiffness of an item can be a function of (e.g., can be proportional to) the cube of the caliper thickness of the item. Bending stiffness can also be related to the modulus of elasticity of the item. In many embodiments, the bending stiffness of a paper layer 35 generally increases as the thickness of the paper layer 35 is increased.

Various instruments may be used to measure stiffness, many of which determine the stiffness of an item by subjecting it to bending of one variety or another. For example, some instruments employ 2-point bending, while others employ 4-point bending. Solid fiber boards and small fluted combined boards (which can be used in folding cartons) are typically measured with 2-point bending instruments. Suitable instruments for measuring bending stiffness can include Taber, Gurley, and L&W instruments.

Industry standards for measuring stiffness adopted by the Technical Association of the Pulp and Paper Industry (TAPPI) can be used to characterize the stiffness of a bag 15 or portions (e.g. layers) thereof. For example, the Gurley Stiffness value can be measured via a Gurley Stiffness Tester, manufactured by Gurley Precision Instruments of Troy, N.Y. The Gurley Stiffness Tester measures the externally applied moment required to produce a given deflection of a strip of material of specific dimensions fixed at one end and having a concentrated load applied to the other end. The results are obtained as "Gurley Stiffness" values, which can be in units of grams.

Similarly, stiffness can be measured in Taber Stiffness Units using a Taber® Stiffness Tester manufactured by Taber Industries of North Tonawanda, N.Y. Taber Stiffness Units can be defined as the bending moment of ⅕ of a gram applied to a 1.5 inch wide specimen at a 5 centimeter test length, flexing it to an angle of 15 degrees. Stiffness Units can be expressed in grams.

To obtain a reading of the Taber Stiffness of a test strip of material, the test strip can be deflected 7.5 degrees or 15 degrees in opposite directions (e.g., to the left and to the right). The average reading of the deflections can then be obtained. This average can then be multiplied using the appropriate number provided in Table A below for a particular range. The resultant product is the stiffness value of the material in Taber Stiffness Units.

TABLE A

| Range | Stiffness Units | Test Length | Roller Position | Specimen Size | Weight | Angle of Deflection | Scaling Multiplier |
|---|---|---|---|---|---|---|---|
| 1 | 0-1 | 2 cm | SR Attachment | 1½ × 1½ | 10 unit compensator | 15° | 0.01 |
| 2 | 0-10 | 1 cm | Up | 1½ × 1½ | 10 unit compensator | 15° | 0.1 |
| 3 | 10-100 | 5 cm | Down | 1½ × 2¾ | — | 15° | 1 |
| 4 | 50-500 | 5 cm | Down | 1½ × 2¾ | 500 units | 15° | 5 |

TABLE A-continued

| Range | Stiffness Units | Test Length | Roller Position | Specimen Size | Weight | Angle of Deflection | Scaling Multiplier |
|---|---|---|---|---|---|---|---|
| 5 | 100-1000 | 5 cm | Down | 1½ × 2¾ | 1000 units | 15° | 10 |
| 6 | 200-2000 | 5 cm | Down | 1½ × 2¾ | 2000 units | 15° | 20 |
| 7 | 300-3000 | 5 cm | Down | 1½ × 2¾ | 3000 units | 15° | 30 |
| 8 | 500-5000 | 5 cm | Down | 1½ × 2¾ | 5000 units | 15° | 50 |
| 9 | 1000-10000 | 5 cm | Down | 1½ × 2¾ | 5000 units | 7.5° | 100 |

The following formula can apply to Taber Stiffness measurements:

$$E = 0.006832 \times (1/(w \times d^3 \times \theta)) \times S_T$$

where E is stiffness in flexure in pounds per square inch, w is specimen width in inches, d is the specimen thickness in inches, θ is the deflection of the specimen expressed in radians, and $S_T$ is Taber Stiffness Units.

There can be a reasonable correlation between Gurley Stiffness and Taber Stiffness, such as for paperboard grades. For example, the following formula can be used to convert between Gurley Stiffness and Taber Stiffness:

$$S_T = 0.01419 S_G - 0.935$$

where $S_T$ is Taber Stiffness Units and $S_G$ is Gurley Stiffness Units. As indicated in TAPPI Test Method T-543, paragraph 4.1.5, Gurley values can range from approximately 1.39 to 56,888 Gurley Stiffness units, and can correspond roughly to Taber values ranging from approximately 0 to 806.3 Taber Stiffness units.

In many embodiments, the stiffness of the paper layer 35 is selected such that the multi-layer material of which a bag 15 is ultimately formed can be laminated on existing machinery. Likewise, in many embodiments, the stiffness of the paper layer 35 is selected such that the material can be formed into the bag 15 on existing converting equipment. In some embodiments, the paper layer 35 can define a thickness in a range of between about 1.75 mils and about 10 mils, and in further embodiments, the thickness can be between about 3.0 mils and about 4.0 mils. For example, in some embodiments, the minimum thickness is about 1.9 mils.

In various embodiments, the film 33 can define a thickness in a range of between about 0.25 mils and about 1.25 mils, between about 0.25 mils and about 0.75 mils, or between about 0.70 mils and about 1.25 mils. In some embodiments, the film 33 can be 48 gauge and/or have a thickness in the range of about 0.475 mils to about 0.485 mils. Increased thickness of the paper layer 35 and/or the film 33 can provide for increased bending stiffness and increased stabilization of a bag 15. In some embodiments, the film 33 can comprise PET and can define a thickness within a range of between about 0.25 mils and about 0.75 mils. In other embodiments, the film 33 can comprise BOPP and can define a thickness within a range of between about 0.70 mils and about 1.25 mils.

In certain embodiments, the paper layer 35 can advantageously enhance the durability of a bag 15. Various basis weights of paper can be utilized, for example, ranging from about 30 pound-force/inch to about 50 pound-force/inch, as these units are understood by those skilled in the art. In other embodiments, the paper can be in a range between about 20 pounds per 3,000 square feet and about 80 pounds per 3,000 square feet. Embodiments of the paper layer 35 can be coated (e.g., clay-coated) and/or bleached, or in other embodiments, can be manufactured without coating or bleach.

In many embodiments, the paper layer 35 is substantially free of fluorocarbons. Many prior art bags include a paper constituent that has been treated with a fluorocarbon chemical, which can provide the paper with a degree of grease resistance. However, in some embodiments in which the paper layer 35 is substantially free of fluorocarbons, interior layers that are applied to the paper layer 35 (as discussed below) can provide sufficient grease resistance.

In other embodiments, the paper layer 35 can be treated to improve its grease-resistance. For example, in some embodiments, the paper layer 35 can be treated with a fluorocarbon chemical. Treatments (e.g., chemical treatments) other than fluorocarbon treatments are also possible, and may provide enhanced protection from grease penetrating through the paper layer 35 of the bag 15.

In some embodiments, an outer face of the paper layer 35 can include printed indicia. Procedures for printing indicia can include process printing, rotogravure printing, innovative flexographic printing, etc. In some embodiments, the film 33 does not include printed indicia 29 (see FIG. 4C) when the paper layer 35 is printed, which can prevent the film 33 from obscuring the printed matter of the paper layer 35. In other embodiments, both the paper layer 35 and the film 33 can include printed portions.

With reference generally to FIGS. 3, 8, 9A, and 9B, in various embodiments, the inner ply 51 is adhered or otherwise joined to the outer ply 31. As shown in FIGS. 3, 6-8, and 9B, in some embodiments, the inner ply 51 comprises multiple layers. As shown in FIG. 9A, in other embodiments, the inner ply 51 comprises a single layer. In either case, the inner ply 51 can be configured to resist or prevent the penetration or absorption of grease, mineral oils, solvents, and acids into or through the walls 1, 2, 3, 4 of a bag 15. The inner ply 51 can thus advantageously prevent grease within the bag 15 from contacting the paper layer 35.

In some embodiments, the inner ply 51 exhibits a high degree of puncture resistance. This property can also be advantageous depending on the type of product stored in a bag 15. For example, in some embodiments, the packed product can be relatively abrasive such that the inner ply 51 is desirably capable of withstanding the formation of pinholes during transportation and/or use of the bag 15.

In some embodiments, the inner ply 51 comprises a high modulus (e.g., modulus of elasticity) such that the inner ply 51 is able to elastically stretch. When incorporated into the multi-layered material that forms the body portion 21 of a bag 15, such an inner ply 51 can provide the bag 15 with resiliency, which can help to prevent rips, tears, or punctures. As further discussed below, in some embodiments, the resiliency afforded by the inner ply 51 can aid in sealing holes created by a sewing needle during assembly of a bag 15.

With reference to FIG. 9A, in certain embodiments, the inner ply 51 can include a single-layer or mono-layer film, which can be grease resistant or can include one or more grease-resistant components. In some embodiments, the inner ply 51 can comprise a polyolefin film layer or a laminate. For example, in certain embodiments, the inner ply 51 comprises nylon or polypropylene. In some embodiments, the inner ply 51 comprises biaxially oriented polypropylene (BOPP). In other embodiments, the inner ply 51 can comprise a material of which merely a component is nylon (e.g., a suitable polyamide) or polypropylene, and can include other materials capable of resisting grease. Some grease-resistant materials can include, for example, metalized films, ethylene vinyl alcohol, polyester, or specialty resins. In some embodiments, the grease-resistant materials provide resistance to and/or prevention of the penetration or absorption of grease, mineral oils, solvents, and/or acids.

In certain embodiments, the inner ply 51 comprises a single layer of polypropylene film. In various embodiments, the polypropylene inner ply 51 can exhibit relatively high grease-resistance, rigidity, translucence, chemical resistance, toughness, fatigue resistance, integral hinge properties, and/or heat resistance. Various forms of polypropylene are possible, and may be selected based on particular needs and cost considerations. For example, the inner ply 51 can comprise homopolymers, block copolymers, or random copolymers. Homopolymers, in this sense, are a general purpose grade polypropylene. Block copolymers can incorporate 5-15% ethylene and have much improved impact resistance extending to temperatures below −20 degrees C. In some instances, the toughness of block copolymers can be increased by the addition of impact modifiers, such as elastomers, in a blending process. Random copolymers can incorporate co-monomer units arranged randomly (as distinct from discrete blocks) along the polypropylene long chain molecule, typically contain 1-7% ethylene, and can be used where a relatively low melting point, relatively high flexibility, and clarity are desired.

In certain embodiments, the inner ply 51 comprises a single layer of nylon film. A nylon inner ply 51 can have such properties as relatively high wear and abrasion resistance, relatively high strength, and/or a relatively high modulus (e.g., modulus of elasticity).

With reference to FIGS. 6-8 and 9B, in certain embodiments, the inner ply 51 includes a multi-layer film or laminate. The inner ply 51 can comprise a core layer 55 positioned between one or more films 53, 54. For example, an inner face of a first film 53 can be abuttingly adhered to an outer face of a core layer 55 and/or an inner face of the core layer 55 can be abuttingly adhered to an outer face of a second film 54. In some embodiments, the core layer 55 and the one or more films 53, 54 are co-extruded such that the inner ply 51 comprises at least three co-extruded layers. Other suitable laminated structures are also possible. For example, in some embodiments, the inner ply 51 comprises four or more co-extruded layers or five or more co-extruded layers. The core layer 55 can be positioned at a center of the inner ply 51 in some embodiments, and in other embodiments, can be at an off-centered position.

One or more of the core layer 55, the films 53, 54, and/or other layers of a ply 51 can comprise any suitable combination of the materials discussed above with respect to the single-layer inner ply 51. In some embodiments, the core layer 55 comprises nylon or polypropylene. In other embodiments, the core layer 55 can comprise a metalized film, ethylene vinyl alcohol, polyester, or a specialty resin. In some embodiments, the core layer 55 is substantially grease-proof, is highly puncture resistant, and/or comprises a high modulus.

In various embodiments, one or more of the films 53, 54 and/or additional co-extruded layers of the inner ply 51 can comprise polyethylene, linear low density polyethylene, or metalicine. Other materials are also possible. In various embodiments, one or more of the films 53, 54 and/or additional co-extruded layers of the inner ply 51 can define a thickness of between about 0.5 mils and about 6.0 mils.

In certain embodiments, one or more of the films 53, 54 can be heat-sealable, which can be advantageous for certain uses of a bag 15 or in certain manufacturing procedures used to construct the bag 15. For example, one or more of the films 53, 54 can be configured to advantageously melt and closingly seal at least one of the bag ends 23, 25 in response to the application of heat. As another example, in some embodiments, an inner film 54 that is heat-sealable can advantageously be coupled to a zipper closure, as further discussed below. In certain embodiments, one or more of the films 53, 54 can comprise heat-sealable polyethylene (PE) or oriented polypropylene (OPP). In some embodiments, the core layer 55 can be heat-sealable. Such an arrangement can be advantageous, such as when the inner ply 51 does not include an inner film 54.

In certain embodiments, the inner ply 51 defines a thickness in a range of between about 0.5 mils and about 7.0 mils. In some embodiments, the thickness is in a range of between about 2.0 mils and about 6.0 mils. Other thickness ranges or gauge values are also possible, and can depend on the use of a bag 15 into which the inner ply 51 is incorporated. For example, in some embodiments, relatively large or heavy bags (e.g., bags having a capacity of about 20 kilograms or more) can benefit from a relatively thicker inner ply 51. Similarly, in some embodiments, bags used to store relatively sharp or abrasive products can benefit from a relatively thicker inner ply 51.

Where the inner ply 51 is formed by a laminated material, the first and second films 53, 54 can be adhered to the core layer 55 of the inner ply 51 in any suitable manner, such as those described above with respect to joining layers of the outer ply 31. For example, in some embodiments, the first and second films 53, 54 can be adhered to the core layer 55 via one or more tie layers 37. In certain embodiments, one or more of the tie layers 37 chemically bonds the respective films 53, 54 to the layer 55. For example, in some embodiments, one or more of the tie layers 37 comprises a functionalized polyethylene copolymer. The one or more tie layers 37 can comprise other suitable adhesives.

In some embodiments, relatively inexpensive varieties of paper can be used for the paper layer 35 in conjunction with the inner ply 51. For example, in some embodiments, the inner ply 51 is sufficiently grease resistant to prevent grease from coming into contact with the paper layer 35. As a result, paper that is untreated for grease resistance may be utilized, which can reduce manufacturing costs. For similar reasons, grease-resistant properties of the film 33 of the outer ply 31 can also contribute to cost savings that result from the use of paper that is not treated for grease resistance. In some embodiments, the paper used for the paper layer 35 can be selected based primarily on the stiffness and stability that it provides to the bag 15 without regard to the grease resistant properties of the paper.

With reference to FIGS. 9A and 9B, in some embodiments, the outer ply 31 is joined to an outer face of the inner ply 51. Any suitable method for joining the outer ply 31 and the inner ply 51 is contemplated, including any suitable method described above with respect to joining layers of the outer ply 31. For example, the inner ply 51 and the outer ply 31 can be joined via co-extrusion. In some embodiments, such as those illustrated in FIGS. 8A and 8B, the inner ply 51 and the outer ply 31 are joined via an adhesive 38. Any other suitable lamination technique is also possible.

Figure 10:
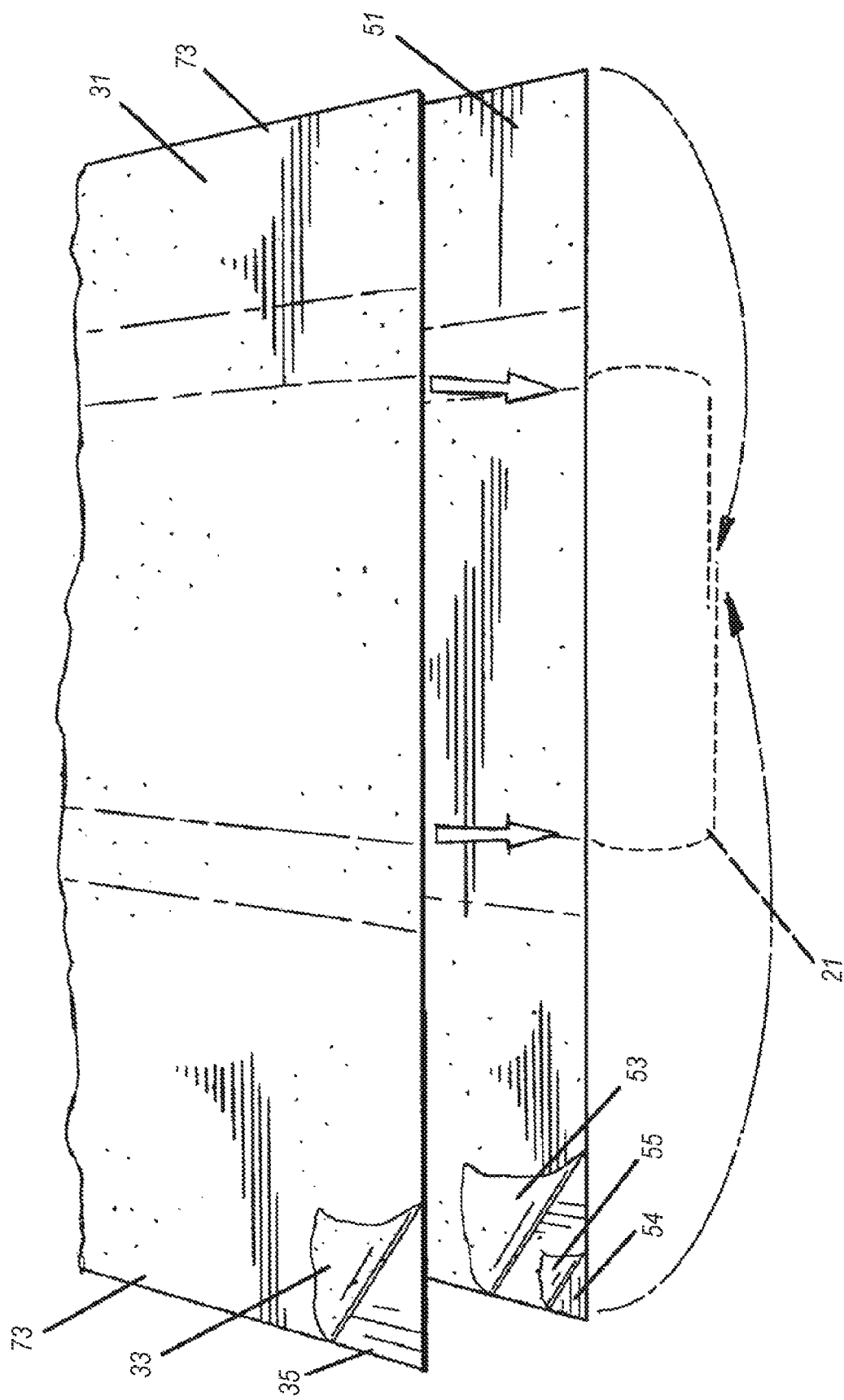
FIG. 10 illustrates a partial exploded view of an embodiment of material such as that of FIG. 8 that is capable of being formed into a tube-like structure.
Figure 11:
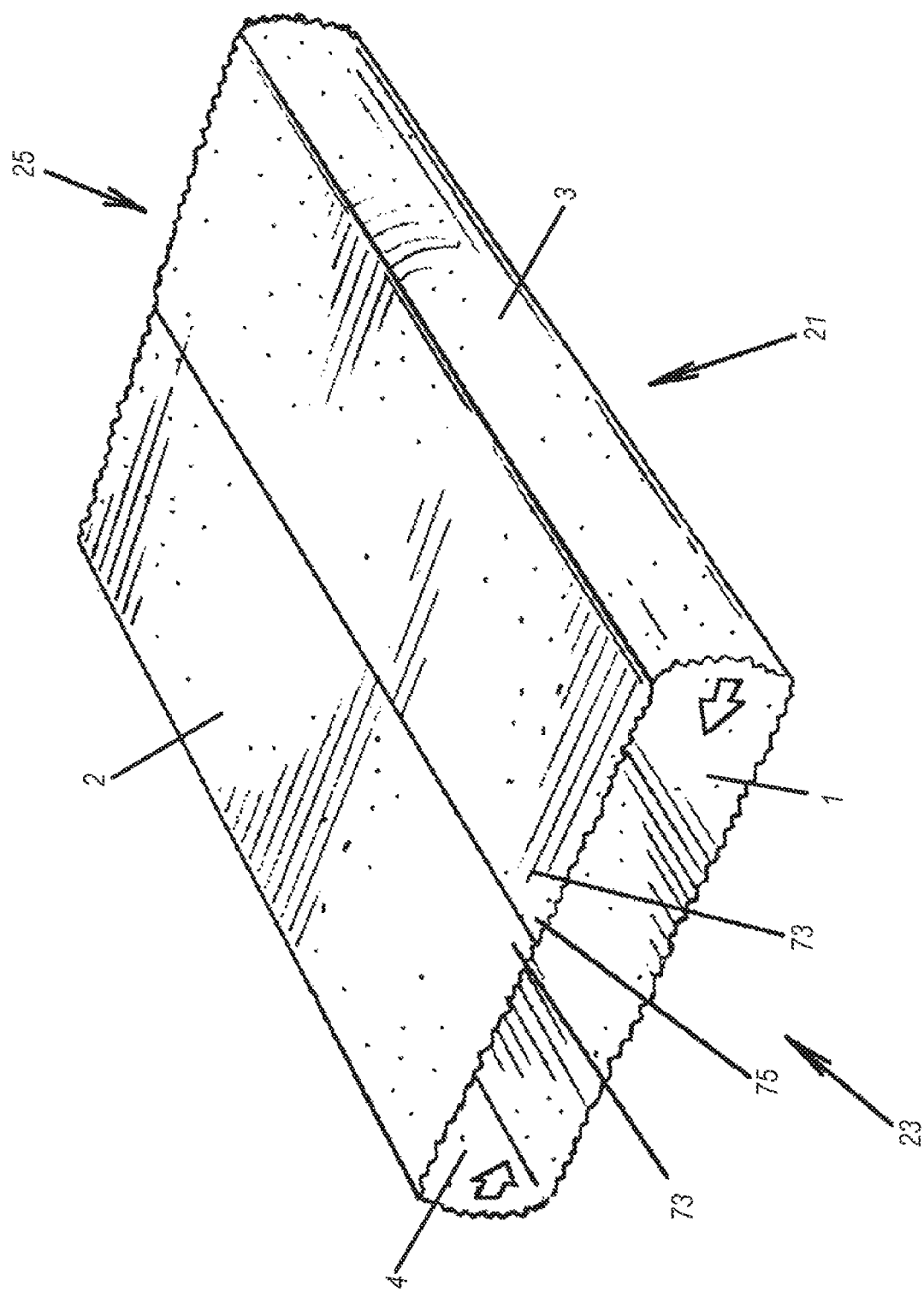
FIG. 11 illustrates a perspective view of the material of FIG. 10 in the form of an embodiment of a tube.

With reference to FIGS. 10 and 11, in some embodiments, multi-layer material formed in any of the manners described above can be converted into a bag 15. For example, the multi-layer material can comprise an outer ply 31 joined to an inner ply 51, and the outer and inner plies 31, 51 can be formed into a bag 15. In some embodiments, the outer and inner plies 31, 51 can be substantially coextensive with each other, save for a protruding salvage edge. For example, in some embodiments, the outer ply 31 overlaps the inner ply 51 and is defines a surface area that is slightly larger than that of the inner ply 51 such that a portion of the outer ply 31 extends past a peripheral edge of the inner ply 51 to define a salvage edge, as this term is understood in the art. In other embodiments, the inner ply 51 can define a salvage edge. In further embodiments, the inner ply 51 can define a surface area that is larger than that of the outer ply 31, or the inner ply 51 and the outer ply 31 can define surface areas that are substantially the same.

In certain embodiments, the material is cut or otherwise formed such that it has opposing lateral sides 73. In some embodiments, the lateral sides 73 are overlapped and joined to each other to define a tubular body 21. The lateral sides 73 can be joined in any suitable manner. For example, in some embodiments, one lateral side 73 is joined to the other lateral side 73 via an adhesive. In other embodiments, the film 33 of the outer ply 31 and the film 54 of the inner ply 51 can comprise heat-sealable materials such that the lateral sides 73 can be joined via a heat seal. In certain embodiments, a portion of the film 54 overlies a portion of the film 33 to define a seam 75, which can extend along a full longitudinal extent of the tubular body 21.

With reference generally to FIGS. 1, 11, 12, and 13, in certain embodiments, at least one end 23, 25 of the tubular body 21 can be sewn closed to provide a bag 15 in a sewn-open-mouth configuration (e.g., having a first end that is sewn closed and a second end that is open). In some embodiments, the bottom end 25 of the bag 15 comprises a closure seam 10 and the top end 23 is left open such that a product can be received into the bag 15 via the top end 23.

Figure 12:
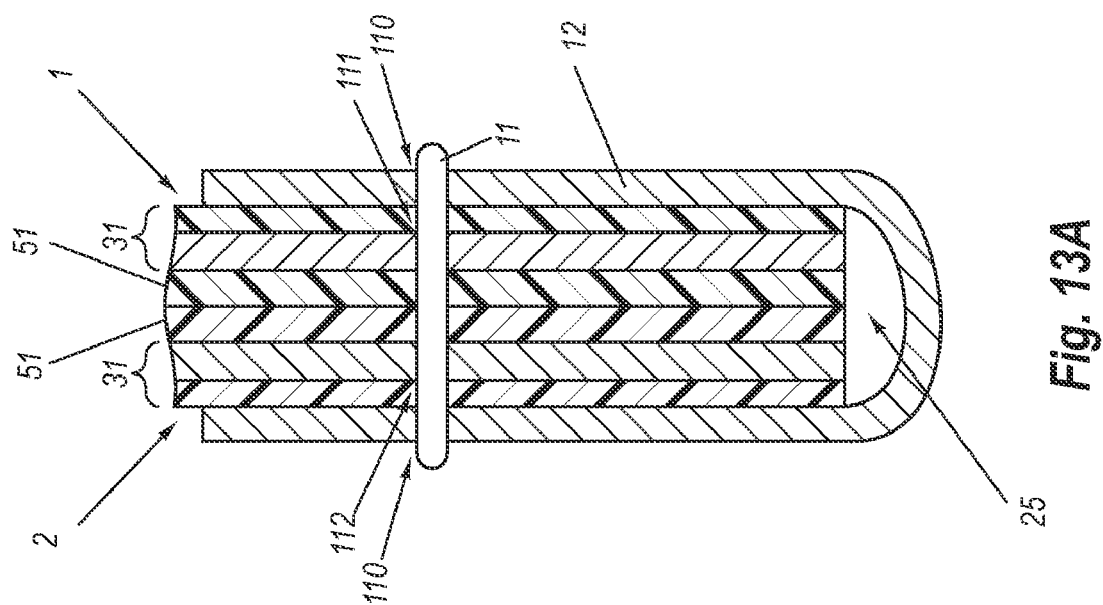
FIG. 12 illustrates a partial cross-sectional view of a sewing needle penetrating an end portion of material during formation of an embodiment of a bag.

With reference to FIGS. 11 and 12, in some embodiments, a method of forming the bag 15 into a sewn-open-mouth configuration includes urging the front wall 1 and the back wall 2 of the tubular body 21 toward one another. Although each of the front and back walls 1, 2 in the illustrated embodiment comprises three layers (i.e., a two-layered outer ply 31 and a single-layered inner ply 51), any suitable layered arrangement disclosed herein is possible. As shown in FIG. 12, The front wall 1 and the back wall 2 can be placed in abutting contact with each other. In further embodiments, a closure strip 12 is placed over the bottom end 25 of the front and back walls 1, 2. For example, the closure strip 12 can be folded or bent such that a portion of the closure strip 12 contacts an outer surface of the front wall 1 and another portion of the closure strip 12 contacts an outer surface of the back wall 2.

Figure 13A:
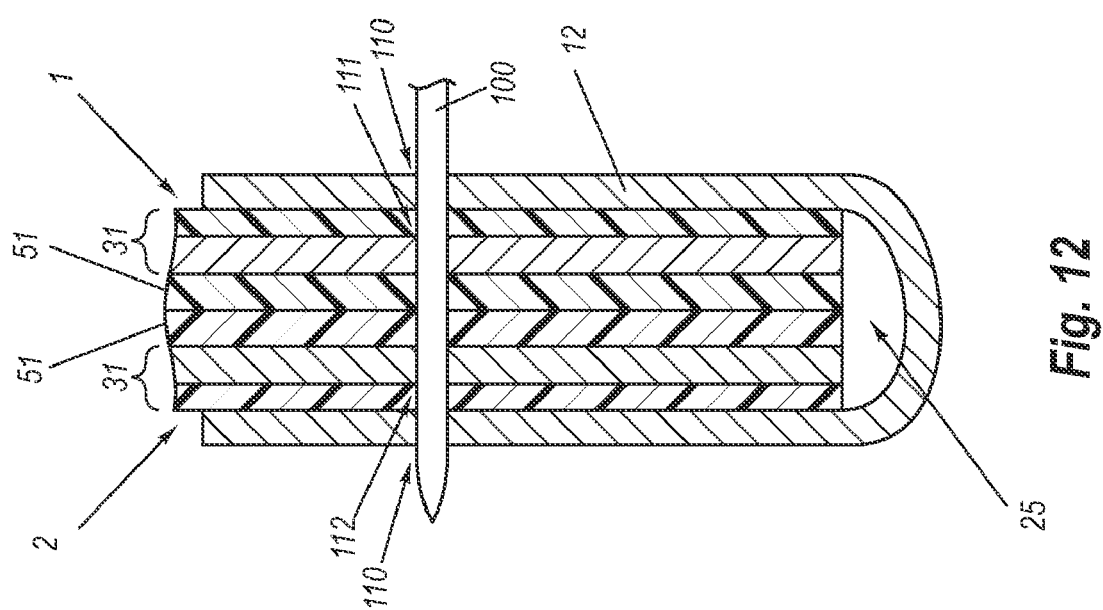
FIG. 13A illustrates a partial cross-sectional view of a portion of an embodiment of a bag through which an embodiment of a stitching element extends.

With reference to FIGS. 12 and 13A, in some embodiments, a stitching element 11 is introduced into a bottom region of the tube body 21 via a stitching needle 100. The stitching needle 100 can be configured to pierce through a first portion of the closure strip 12, the front wall 1, the back wall 2, and a second portion of the closure strip 12. The stitching needle 100 thus can form openings 110 in the closure strip 12, an opening 111 in the front wall 1, and an opening 112 in the back wall 2.

In some embodiments, the stitching needle 100 carries the stitching element 11 through the openings 110, 111, 112 and positions a portion of the stitching element 11 within the openings 110, 111, 112. Accordingly, upon removal of the stitching needle 100 from the bottom end 25 of the tube body 21, the stitching element 11 can extend through the openings 110, 111, 112 in a substantially fixed state.

The stitching element 11 can hold the front wall 1 and the back wall 2 in close engagement with one another so as to form a substantially grease-impermeable seal. As used herein the term grease-impermeable seal is used in its ordinary sense, and can include a seal that prevents the passage of grease thereby. Accordingly, a substantially grease-impermeable seal formed at a bottom end 25 of a bag 15 can substantially prevent grease from entering or exiting the bag 25 via the bottom end 25. As illustrated in FIG. 1, in some embodiments, the stitching element 11 can extend across a full transverse width of the bag 15 (e.g., from one lateral edge of the front wall 1 to an opposing lateral edge of the front wall 1), and can form a substantially grease-impermeable seal along the full transverse width of the bag 15. In further embodiments, the substantially grease-impermeable seal can also substantially prevent the passage of odors via the seal.

In some advantageous embodiments, the front and back walls 1, 2 are configured to close around the stitching element 11 upon removal of the stitching needle 100. For example, in some embodiments, the memory of the inner ply 51 (or a portion thereof, such as a core layer 55) is sufficiently large to permit the inner ply 51 to elastically deform as the stitching needle 100 passes through it. Upon removal of the needle 100, the inner ply 51 can move toward a more relaxed, more natural, or more constricted configuration and can close around the stitching element 11. The inner ply 51 can contact, constrict, or otherwise interact with the stitching element to form a substantially grease-impermeable seal. In some embodiments, a substantially grease-impermeable seal formed between the front and back walls 1, 2 and the stitching element 11 at the openings 111, 112 can substantially prevent the passage of odors via the seal.

In some embodiments, the outer ply 31 can form, or contribute to the formation of, a substantially grease-impermeable seal between the front and back walls 1, 2 and the stitching element 11. For example, in some embodiments, the memory of the outer ply 31 (or a portion thereof, such as the film 33) is sufficiently large to permit the outer ply 31 to elastically deform as the stitching needle 100 passes through it and to move toward a more constricted state upon removal of the needle 100.

In some embodiments, the memory of a material is affected by the thickness of the material. The term "memory" is used herein in its ordinary sense, and can include a property of the material by which the material can be stretched from a first position to a second position, and upon release from the second position, can completely return, or can return by a percentage amount, to the first position. By way of example, in some instances, PET films have a relatively low memory and PE films have a relatively high memory. In many instances, the memory of a material increases as the thickness of the material increases. In various embodiments, the thickness of the inner ply 51, or a portion thereof (e.g., the core layer 55), is between about 1 mils and about 6 mils, between about 2 mils and about 5 mils, or between about 3 mils and about 4 mils. In various embodiments, the thickness of the outer ply 33, or a portion thereof (e.g., the film 33), is between about 1 mils and about 6 mils, between about 2 mils and about 5 mils, or between about 3 mils and about 4 mils.

In certain embodiments, the stitching element 11 can comprise a material configured to interact with one or more materials of the front and back walls 1, 2 to form a substantially grease-impermeable seal therewith. In various embodiments, the stitching element can comprise cotton, a polyolefin, and/or a blend of synthetic materials and cotton.

Figure 13B:
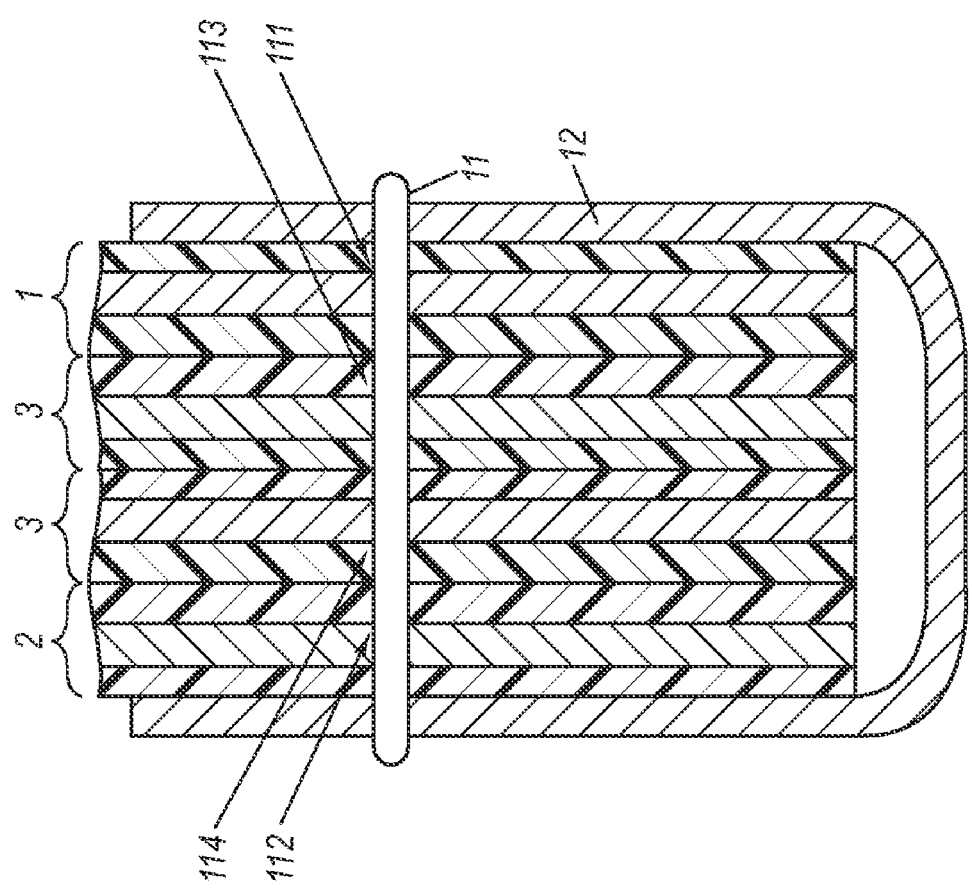
FIG. 13B illustrates a partial cross-sectional view of another portion of the bag of FIG. 13A through which an embodiment of a stitching element extends.

As illustrated in FIGS. 1, 2, 11, and 13B, in certain embodiments, a bag 15 can be formed with gusseted sidewalls 3, 4. With reference to FIG. 11, in some embodiments, the sidewalls 3, 4 of the tube body 21 can be urged inward to form the gussets, as depicted by block arrows, and can be creased or folded. With reference to FIG. 13B, in some embodiments, the stitching element 11 can extend through two separate portions of a gusseted side wall (e.g., the side wall 3). In the illustrated embodiment, the front wall 1 defines the opening 111, the back wall defines the opening 112, a first portion of the side wall 3 defines a third opening 113, and a second portion of the side wall 3 defines a fourth opening 114. The stitching element 11 can extend through the first, second, third, and fourth openings 111, 112, 113, 114 in a substantially fixed state. The stitching element 11 can hold the front wall 1 and the first portion of the side wall 3 in close engagement with one another so as to form a substantially grease-impermeable seal. Similarly, the stitching element 11 can hold the second portion of the side wall 3 and the back wall 2 in close engagement with one another so as to form a substantially grease-impermeable seal.

With reference to FIG. 2, in some embodiments, a product 17 can be introduced into the bag 15 after a closure seam 10 has been formed at the bottom end 25 of the bag 15. In further embodiments, the top end 23 of the bag 15 can then be sealed in any suitable fashion. For example, as discussed above, in some embodiments, a closure seam 13 such as the closure seam 10 is provided at the top end 23 of the bag 15.

Figure 14:
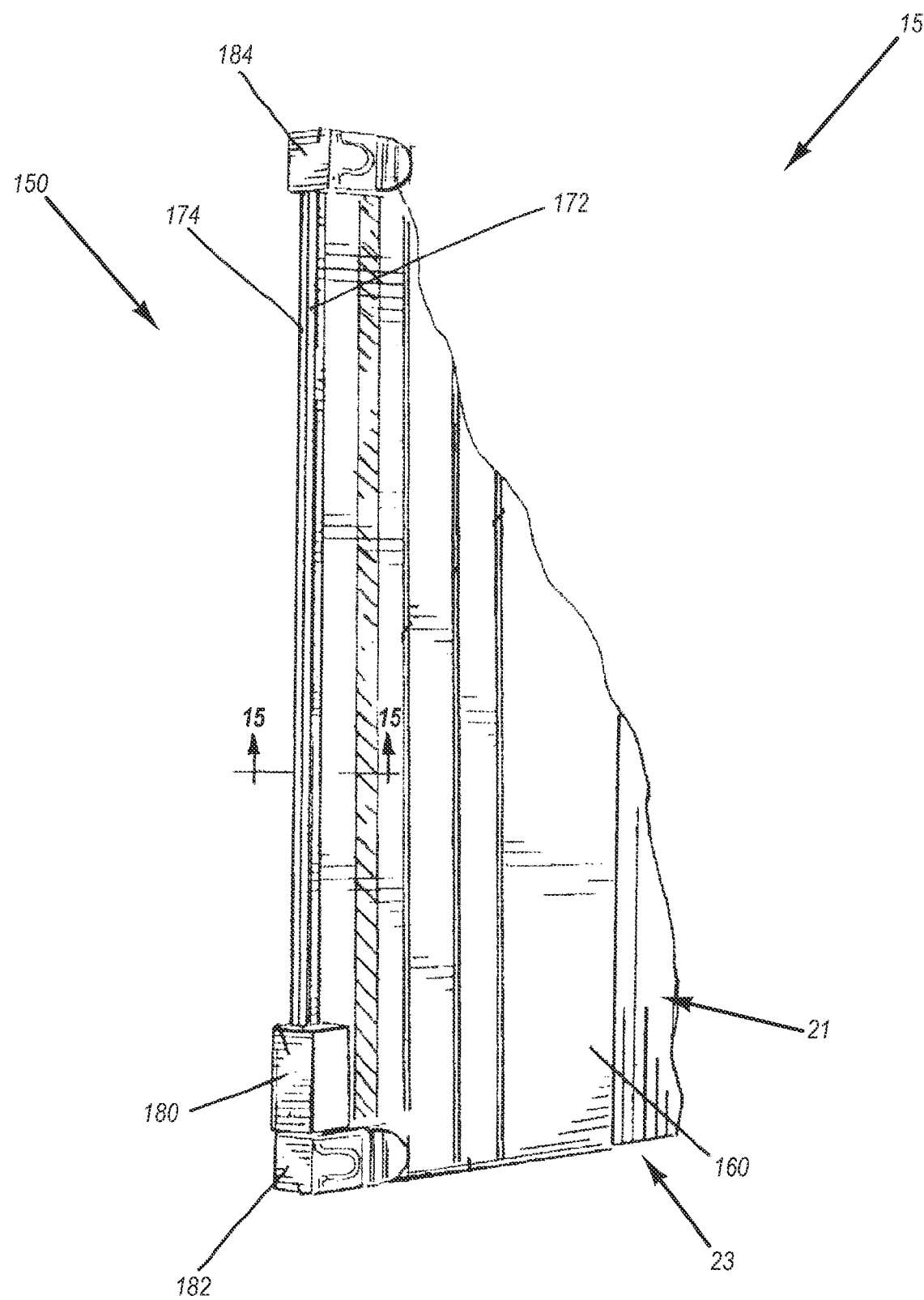
FIG. 14 illustrates a perspective view of a portion of an embodiment of a zipper closure at an end of an embodiment of a bag.

With reference to FIG. 14, in other embodiments, the top end 23 of the bag can comprise a zipper closure 150. In certain embodiments, the zipper closure 150 can be reclosable such that the closure can be selectively opened or closed repeatedly, as desired. In some embodiments, the zipper closure 150 comprises one or more connection portions 160, which can comprise a skirt, flaps, or extensions. The connection portions 160 can be connected to the top end 23 of the tube body 21 in any suitable manner, and in some embodiments, can form a substantially airtight, fluid-tight, and/or grease-impermeable seal therewith, as further discussed below.

In some embodiments, the zipper closure 150 comprises a first zipper track 172 and a second zipper track 174 that are configured to selectively engage each other and disengage from each other. In some embodiments, the zipper tracks 172, 174 can form a substantially airtight, fluid-tight, and/or grease-impermeable seal when engaged with each other. In further embodiments, the zipper closure comprises a sliding block 180 configured to transition the zipper tracks 172, 174 between the engaged and disengaged states. The block 180 can move between two stops 182, 184, which can serve to limit the translational movement of the block 180.

Figure 16:
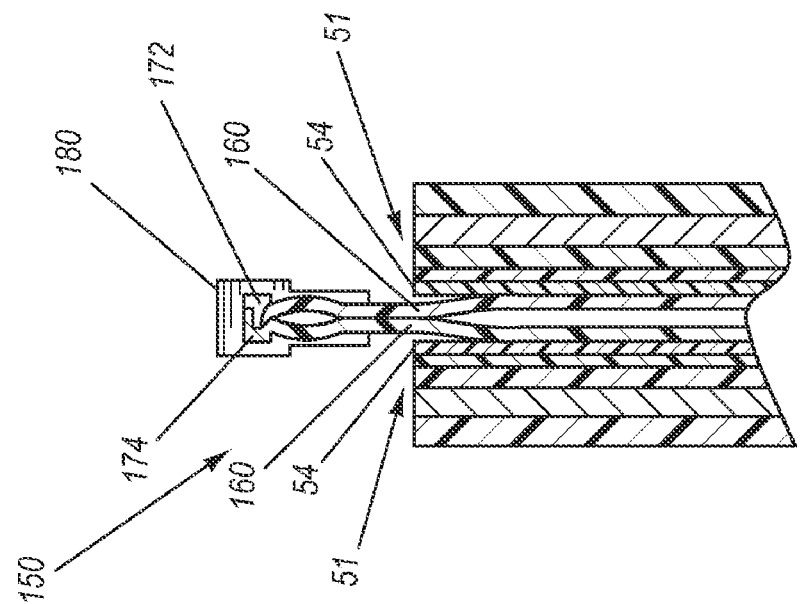
FIG. 16 illustrates a partial cross sectional view of another embodiment of a zipper closure.
Figure 15:
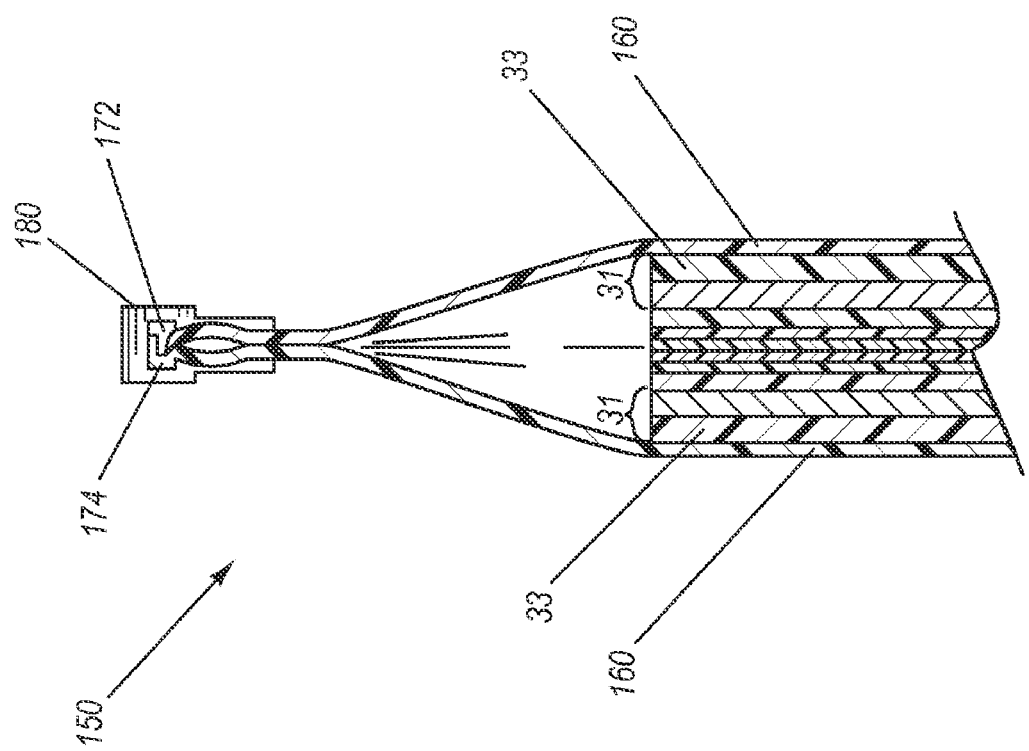
FIG. 15 illustrates a partial cross-sectional view of the zipper closure of FIG. 14 taken along the view line 15-15 in FIG. 14.

With reference to FIGS. 15 and 16, in some embodiments, the block 180 can compress the first and second zipper tracks 172, 174 into sealed contact with each other to transition the zipper tracks 172, 174 to the engaged state. The block 180 can cause the first and second zipper tracks 172, 174 to separate from each other to transition the zipper tracks 172, 174 to the disengaged state.

With reference to FIG. 15, in some embodiments, the connection portion 160 of the zipper closure 150 comprises a heat sealable material. In some embodiments, the connection portion 160 is placed in contact with an outer surface of a heat sealable portion of the outer ply 31 (e.g., the film 33) and is heat sealed thereto. With reference to FIG. 16, in other embodiments, the connection portion 160 is placed in contact with an inner surface of a heat sealable portion of the inner ply 51 (e.g., the film 54) and is heat sealed thereto. Any suitable heat sealing methods and materials may be used, such as those discussed herein.

In other embodiments, a heat-sealed and/or an adhesion seam can be used to close the top end 23 of the bag 15. FIGS. 17-20B illustrate certain embodiments of such closure seams. As discussed above, various embodiments of the bag 15 can be sewn at either the bottom end 25 or the top end 23 of the bag, and the other end can be closed in any suitable manner. Accordingly, for certain portions of the following discussion, it can be assumed that the bottom end 25 of the bag has been previously sealed (e.g., via the sewn closure seal 13 discussed above), and the top end 23 of the bag is subsequently sealed. Moreover, certain references to the top end 23 may also refer to the bottom end 25, as either end can be closed secondarily. The following discussion and examples are merely illustrative, and should not be construed as limiting.

Figure 17:
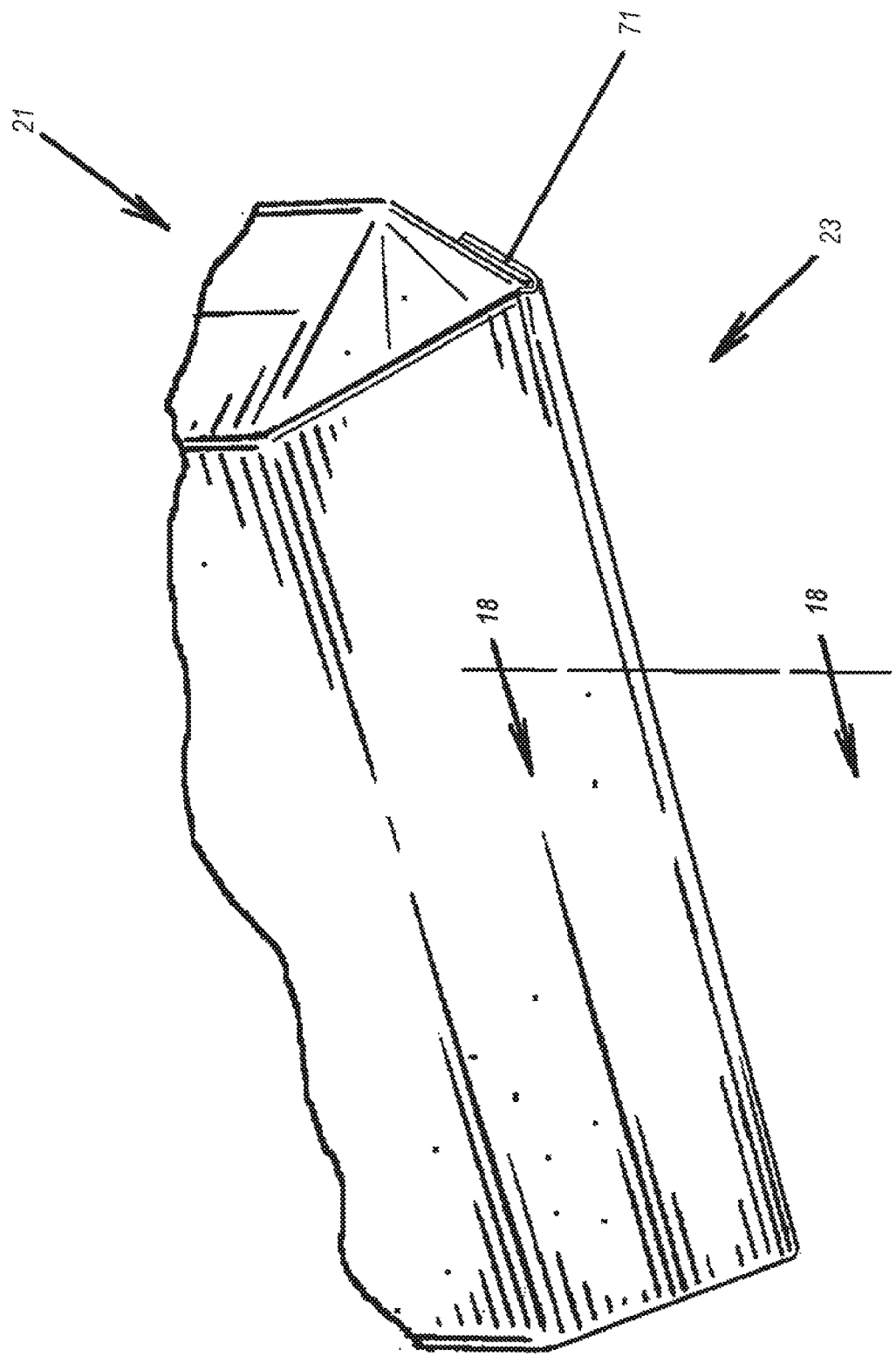
FIG. 17 illustrates a partial perspective view of an embodiment of a closed end of a bag.
Figure 18A:
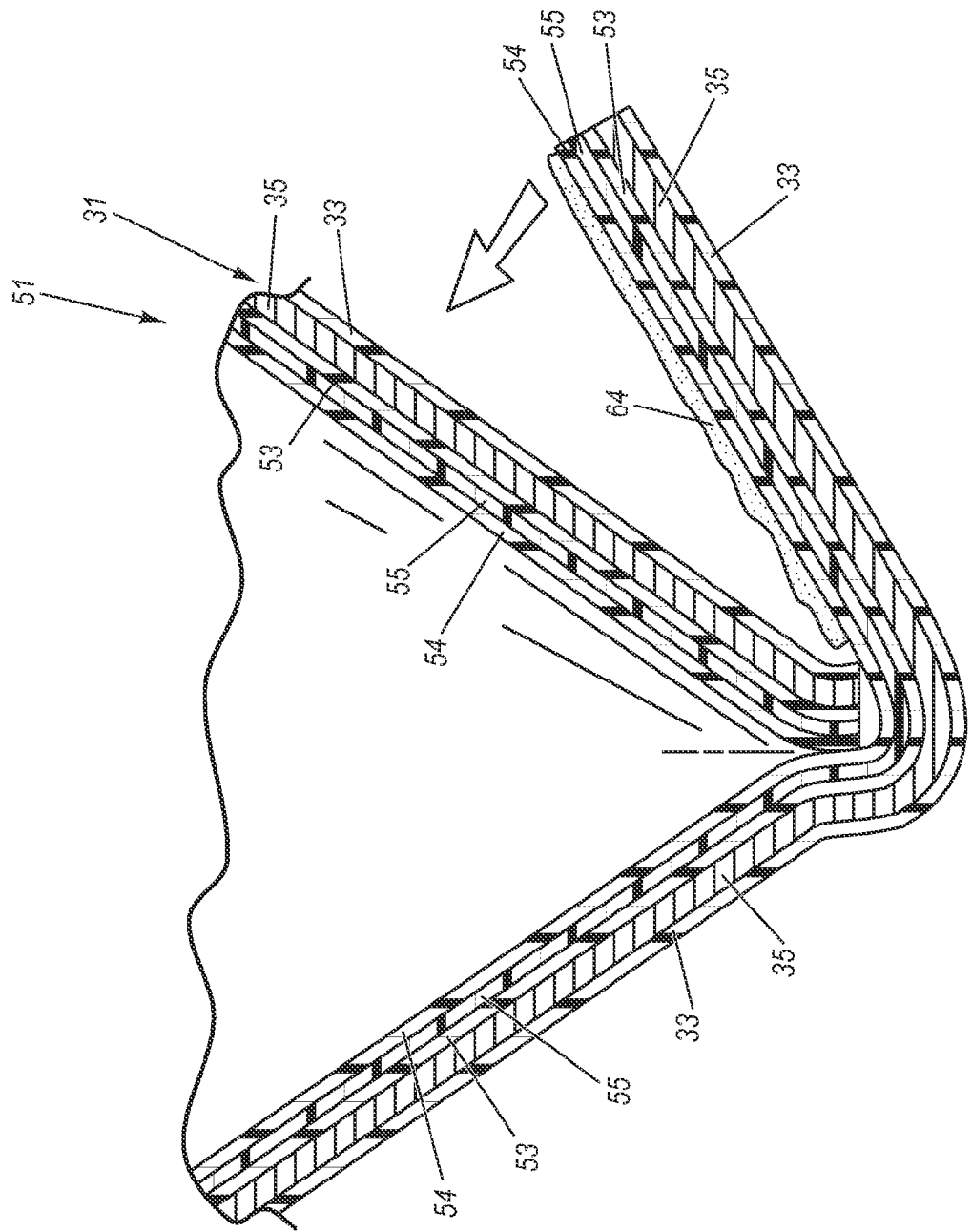
FIG. 18A illustrates a cross-sectional view of the bag of FIG. 17, during formation of the closed end, taken along the view line 18-18 in FIG. 17.
Figure 18B:
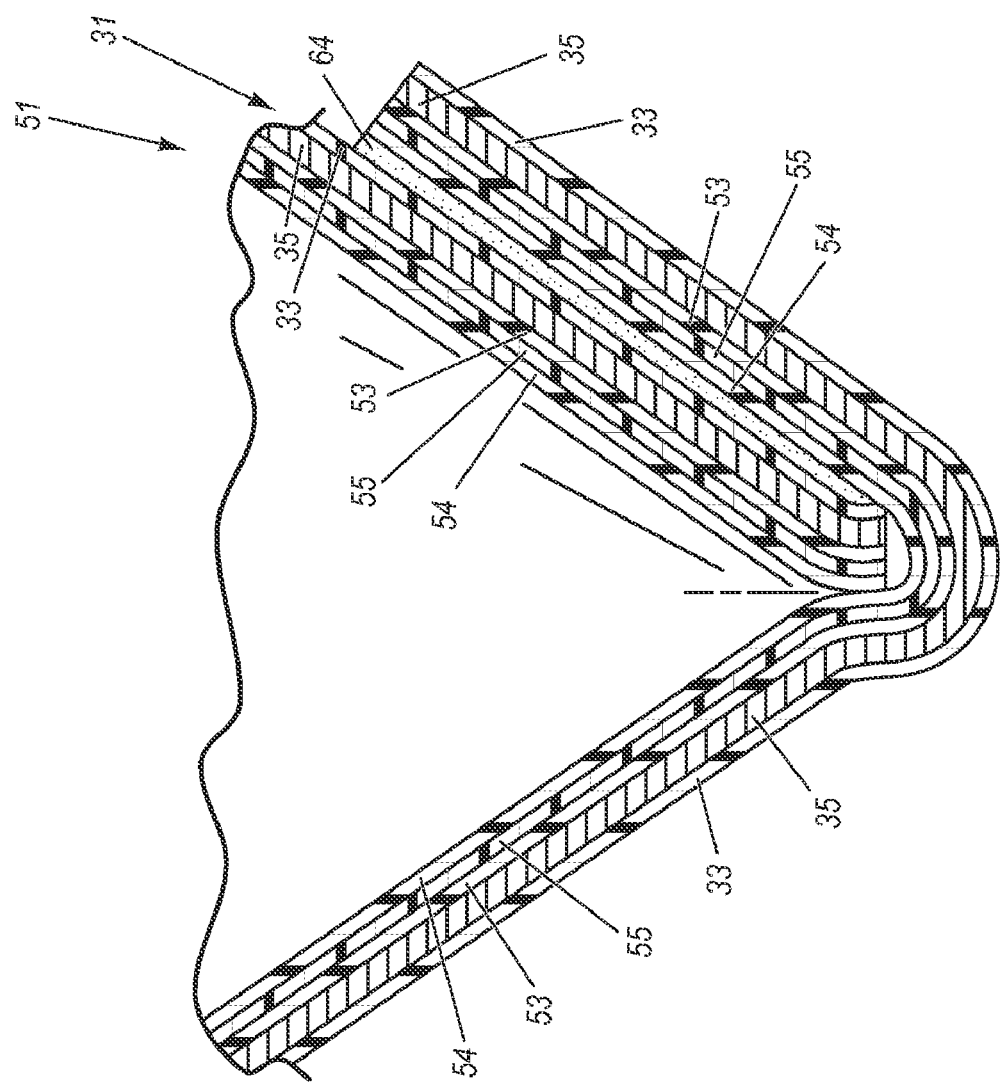
FIG. 18B illustrates a cross-sectional view of the bag of FIG. 18A, after formation of the closed end, taken along the view line 18-18 in FIG. 17.
Figure 18C:
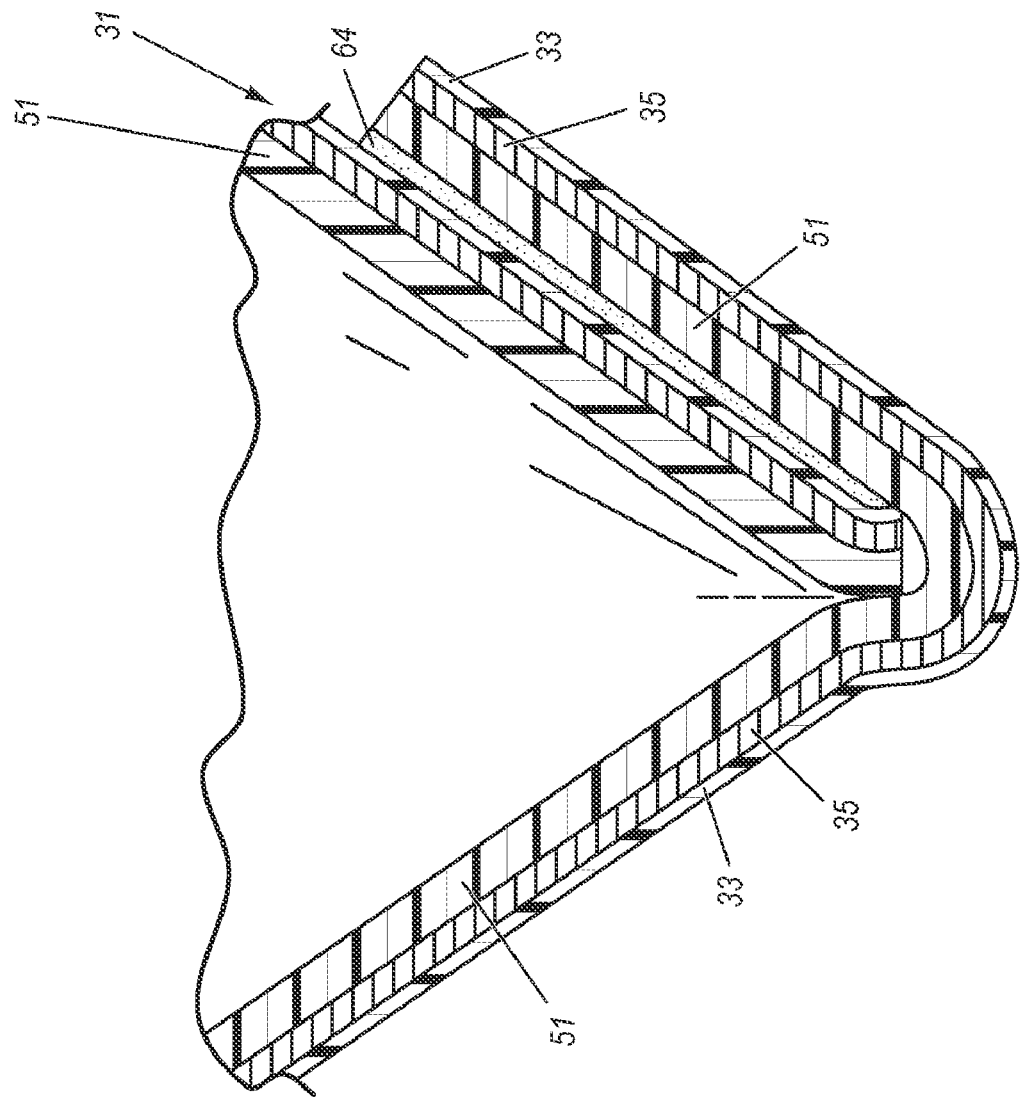
FIG. 18C illustrates a cross-sectional view such as that of FIG. 18A of another embodiment of a closed end of a bag.
Figure 18D:
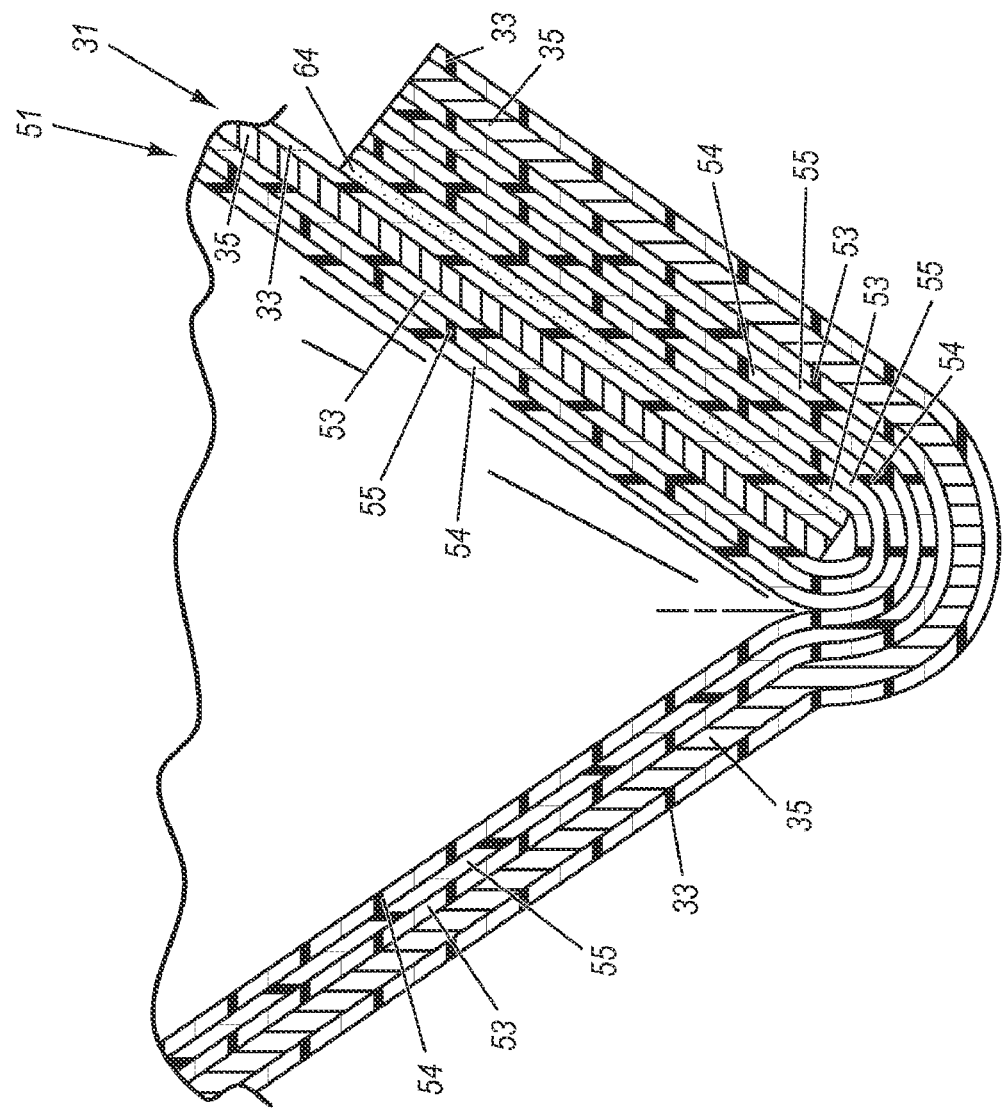
FIG. 18D illustrates a cross-sectional view such as that of FIG. 18A of another embodiment of a closed end of a bag.
Figure 18E:
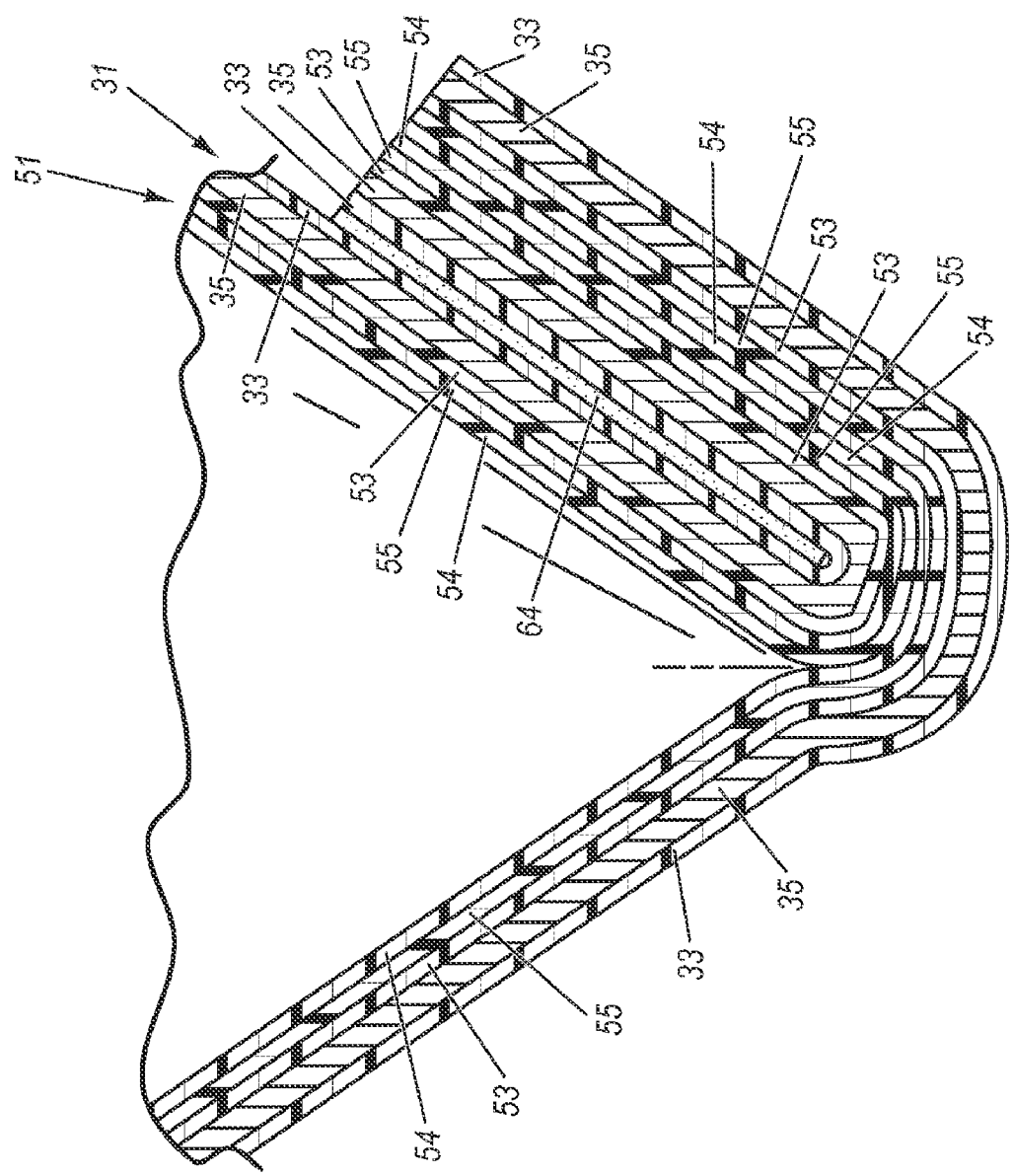
FIG. 18E illustrates a cross-sectional view such as that of FIG. 18A of another embodiment of a closed end of a bag.

With reference to FIGS. 17-18E, in some embodiments, a portion of at least one of the inner and outer plies 51, 31 of at least one of the opposing bag ends 23, 25 foldingly and adheringly overlying another portion of the one bag end 23 to define an overlapping seam extending along substantially an entire transverse extent of the one bag end 23 to thereby closingly seal the one bag end 23 so that a product, when positioned therein, is retained within inner confines of the bag 15 between the opposing pair of bag ends 23, 25. Embodiments can include the inner face of the inner ply 51 of at least one of the opposing bag ends 23 adheringly overlying the outer face of the outer ply 31 of the same bag end 23 to define an overlapping seam substantially extending along a transverse extent of the bag end 23. Embodiments can also include the outer face of the outer ply 31 of at least one of the opposing bag ends 23 adheringly overlying the same outer face of the same outer ply 51 of the same bag end 23 to define an overlapping seam substantially extending along a transverse extent of the bag end 23.

Additionally, such as shown in FIG. 11, embodiments of a bag and/or bag closure can include an adhesive 64 including components of rosin ester and ethylene vinyl acetate adhering a portion of at least one of the inner and outer plies 51, 31 of at least one of the opposing bag ends 23 to another portion of the same bag end 23 to define an overlapping seam substantially extending along a transverse extent of at least one of the pair of bag ends 23. The hot melt adhesive 64 can be supplied, for example, as Product No. 70-4467 from NATIONAL STARCH AND CHEMICAL COMPANY, 10 Finderne Avenue, Bridgewater, N.J. 08807. In further embodiments, the adhesive 64 can include a component selected from the group consisting of styrene-isoprene-styrene copolymers, styrene-butadiene-styrene copolymers, ethylene ethyl acrylate copolymers, polyurethane reactive adhesives, tackifiers, waxes, paraffin, antioxidants, plasticizers, plant sterols, terpene resins, polyterpene resins, turpentines, hydrocarbon resins, resin acids, fatty acids, polymerized rosins, and polyamide adhesives.

Other embodiments of the bag 15, such as those illustrated for example in FIGS. 18A-18D, can include a tubular bag body having a pair of opposing bag ends 23, 25 and an inner face of an outer ply 31 abuttingly adhering to an outer face of an inner ply 51. The outer ply 31 can include a grease-resistant film, and the inner ply 51 can include a grease-resistant material. An end portion of at least one of the inner and outer plies 51, 31 of at least one of the opposing bag ends 23 can adheringly overlie another portion of the same bag end 23 with an adhesive 64, such as described above, so that the grease resistant film of the outer ply 31 contacts the adhesive 64 and the grease resistant material of the inner ply 51 contacts the adhesive 64 to thereby define an overlapping seam substantially extending along a transverse extent of the same bag end 23 to thereby closingly seal the bag end 23.

Other embodiments of the bag 15, such as that shown in FIG. 18E, can include a tubular bag body having a pair of opposing bag ends 23, 25 and an inner face of an outer ply 31 abuttingly adhering to an outer face of an inner ply 51. The outer ply 31 can include a polyester film, and the inner ply 51 can include a polymeric material. An end portion of at least one of the inner and outer plies 51, 31 of at least one of the opposing bag ends 23 can adheringly overlie another portion of the same bag end 23 with an adhesive 64, such as described above, so that the polyester material of the outer ply 31 contacts the adhesive 64 and the polymeric material of the inner ply 51 contacts the adhesive 64 to thereby define a bag closure to thereby define an overlapping seam substantially extending along a transverse extent of the same bag end 23 to thereby closingly seal the bag end 23.

Within the adhesives industry, hot melts, for example, can have good performance and usage benefits, as understood by those skilled in the art. Hot melt adhesives can be solvent-free adhesives that are characteristically solid at temperatures below 180 degrees F., are low viscosity fluids above 180 degrees F., and rapidly set upon cooling. Hot melt adhesives are used in a variety of manufacturing processes. There are a number of hot melt adhesives in use, with the most common being those used for hot melt pressure sensitive adhesive applications. For example, hot melt adhesives can include ethylene vinyl acetate (EVA) copolymers, which can be compatible with paraffin; styrene-isoprene-styrene (SIS) copolymers; styrene-butadiene-styrene (SBS) copolymers; ethylene ethyl acrylate copolymers (EEA); and polyurethane reactive (PUR).

Generally, these polymers may not exhibit the full range of performance characteristics that can be required for certain end products by themselves. For this reason, for example, a variety of tackifying resins, waxes, antioxidants, plasticizers, viscosity reducers, and other materials can be added to the adhesive formulation to enhance the polymer performance.

For example, the PUR adhesive is a 100 percent solid, one-component urethane prepolymer that behaves like a standard hot melt until it reacts with moisture to crosslink or chain extend, forming a new polyurethane polymer. By curing the polymer in this way, PURs have performance characteristics that can be more enhanced than those of standard hot melts. Unlike many of the other hot melts, which can require a slot die or roll coater, PURs can be applied to a substrate as a dot or a thin glue line, can set in seconds, and can be structurally rigid in minutes following a final set. These adhesives have been accepted in many manufacturing industries, for example, where they can be applied in small bond points to eliminate use of mechanical fasteners, such as staples, screws, rivets, clips, snaps, nails or stitching.

Furthermore, for example, certain groups of pine chemicals (with the exception of plant sterols, in many instances), can also be used by the adhesives and sealants industry. Pine chemicals are renewable, naturally occurring materials derived from the pine tree (genus *pinus*). The range of chemical classes obtained from pine trees includes numerous plant sterols, terpenes (or turpentine), resin acids (or rosin) and fatty acids. Rosin resins, including esters and polymerized rosins, are used as tackifiers to modify the properties of selected polymers to produce adhesives and sealants. Polyterpene resins are used to modify non-polar polymers for these same applications. Tall oil fatty acids can be dimerized to produce dimer fatty acids that, in turn, can be a major ingredient in thermoplastic polyamide adhesives.

For example, three major classes of tackifier resins for the adhesives industry can include terpene, hydrocarbon and rosin resins. Terpene resins (pine-based) and hydrocarbon resins (petrochemical-based) are both hydrocarbons; that is, they contain only carbon and hydrogen. Although they are somewhat similar in that respect, they impart somewhat different properties to the resultant adhesives. Terpene-based resins are more diverse than petrochemical hydrocarbons in that these resins can be readily modified with other chemicals (e.g., phenol) to produce an array of products. Notably, for example, rosin resins significantly differ from the previous two types in that they contain carboxylic acid and/or ester groups. These resins are generally more polar and narrower in molecular weight, for example, making them good tackifiers for a variety of end-use applications.

In some instances, hot-melt packaging adhesives can be developed to run faster than traditional adhesives, in some applications, and can perform on a range of substrates. Terpene phenolic resins, derivatives of alpha-pinene, can deliver enhanced adhesion qualities to difficult substrates such as recycled cardboard. They can offer better green strength, making them useful for high-speed packaging lines with short set times. Rosin esters are commonly used to increase adhesion and the temperature performance range of ethylene vinyl acetate (EVA) based adhesives. This combination of elements in a hot melt adhesive can be used as a closure (e.g., end, sides, or other overlap region) for a bag in applications, for example, of a polyester or grease-resistant material facing another polymeric or grease resistant material. Rosin esters can be compatible with a range of polymers, thus limiting formulating complexity.

Ethylene vinyl acetate (EVA), for example, can be produced by the random copolymerization of ethylene and vinyl acetate in predetermined ratio. The presence of VA reduces the crystallinity as the large acetoxy group distorts the chain structure. The stiffness of EVA varies with VA content. However, beyond about 60 percent VA, the stiffness rises sharply as pure vinyl acetate is a glass-like substance at room temperature. The practical limit for certain "mechanical" uses of EVA is about 20 percent VA content; however, for certain "adhesive" uses, higher levels of VA can be employed. High VA level copolymers are typically used in adhesive applications, while lower vinyl acetate containing copolymers, which can have greater tensile moduli and surface hardness, find greatest use in films, profile extrusions and injection molding. The higher percent VA resins have a good compatibility with other materials. Thus, EVA is widely used in blends and compounds. One main application, for example, is hot melt adhesives, where the EVA is blended with tackifier and paraffin wax.

As understood by those skilled in the art, the polarity of the VA molecule makes the copolymers receptive to high filler loadings and to combination with tackifiers and other adhesive components. The addition of the rosin ester to EVA can produce a compatible mixture. The increase in the VA amount decreases the crystallinity of EVA and the elastic and viscous modules, but increases the peel strength and the tack. The tackifier improves the adhesion and increases the "open time" of the formulation.

Figure 19:
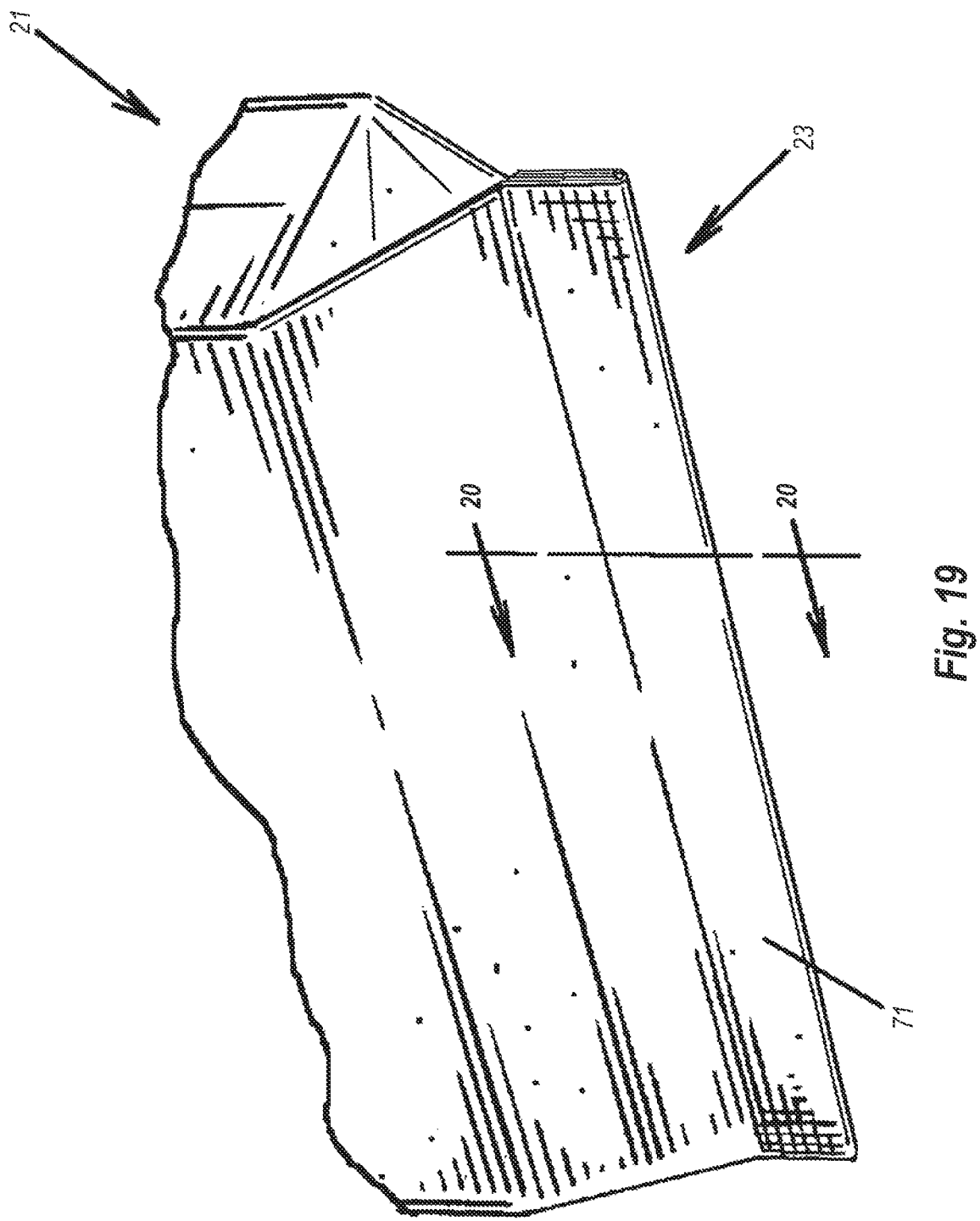
FIG. 19 illustrates a perspective view of another embodiment of a closed end of a bag.
Figure 20A:
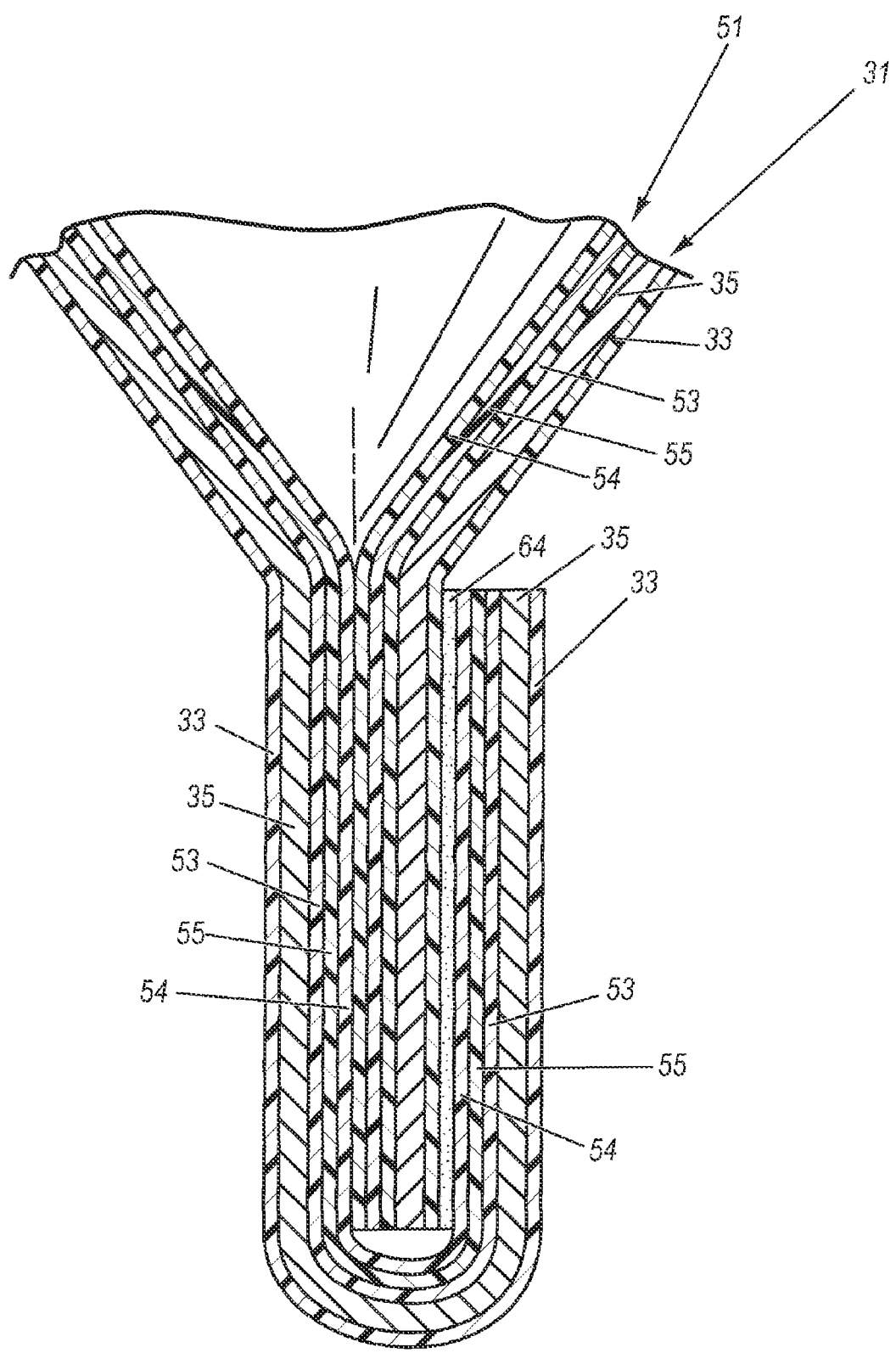
FIG. 20A illustrates a cross-sectional view of the closed end of the bag shown in FIG. 19 taken along the view line 20-20 in FIG. 19.
Figure 20B:
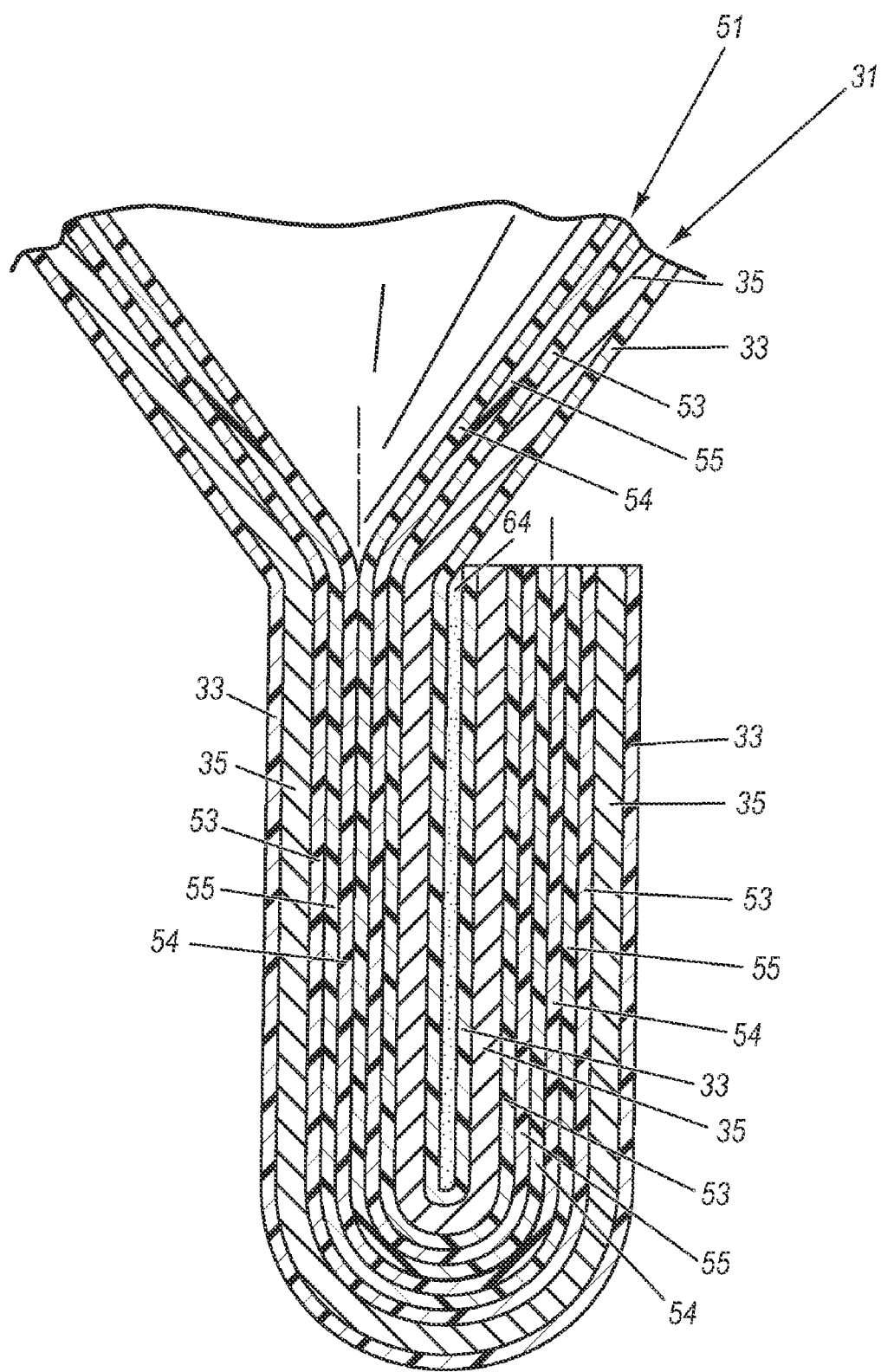
FIG. 20B illustrates a cross-sectional view such as that of FIG. 20A of another embodiment of a closed end of a bag.

In a further embodiment in which one or more bag ends or other bag closures are heat-sealed, a bag end 23 is adapted to be positioned so that opposingly facing first and second portions of the inner ply 51 are compressed between opposingly facing first and second portions of the outer ply 31 to define a compressed lip 71, as shown in FIGS. 19-20B. The compressed lip 71, for example, can have a first portion of the second heat-sealable film 54 of the inner ply 51 meltingly bonded with an opposingly facing second portion of the second heat-sealable film 54 of the inner ply 51 along a transverse extent of at least one of the pair of bag ends 23, 25 responsive to heat applied thereto. Application of the heat to the bag end 23 thereby advantageously closingly seals the bag end 23 so that a food element 17, when positioned therein, is retained within inner confines of the bag 15 defined by other unsealed portions of the second heat-sealable film 54 positioned between the opposing bag ends 23, 25. FIG. 3 shows an embodiment of a bag where the food element 17 is positioned inside the bag, illustrating the grease component G being prevented from penetrating the inner and outer plies 51, 31 of the food bag 15.

Each of the materials used to construct the bag 15 can have a different range of melting temperatures. For example, in some embodiments, a polyester film 33 of the outer ply 31 has a melting point temperature greater than a heat-sealable film 54 of the inner ply 51. In one embodiment, the polyester film 33 of the outer ply 31 has a melting temperature in the range of about 300 degrees Fahrenheit to about 475 degrees Fahrenheit, and preferably greater than 425 degrees Fahrenheit. In one embodiment, the heat-sealable film 54 of the inner ply 51 has a melting point temperature in the range of about 220 degrees Fahrenheit to about 300 degrees Fahrenheit, and preferably greater than 240 degrees Fahrenheit. As understood by those skilled in the art, the polyethylene heat-sealable film 54 of the inner ply 51 has a lower melting temperature and therefore melts easier and at lower temperatures than the grease-resistant polyester film 33 of the outer ply 31. A sufficiently low melting point temperature for the heat-sealable film 54 of the inner ply 51 advantageously allows for the melting and bonding of the second heat-sealable film 54 to closingly seal the bag end 23, 25.

For example, as understood by those skilled in the art, heat-sealing bag machine performs the function of forming and shaping the multi-layered structure into a bag 15 by accordingly compressing and melting the bag ends 23, 25 to closingly seal the bag ends 23, 25. The heat-sealing bag machine has an extended heater belt and/or heated jaws that carry out the heat-sealing procedure. The heat can alternatively be applied, for example, by heated rollers, a heated wire/wires, or a heated air zone that adequately melts the heat-sealable film 54, as understood by those skilled in the art. The extended heater belt and/or heated jaws can mass-produce the heat-sealed products through a continuous high-speed operation, which manufactures a quality product in massive quantities to be delivered to customers. In some applications, for example, the bag manufacturer typically heat-seals one end of each bag and delivers the bag to a customer, and the customer fills the bag with the proper elements and ultimately heat-seals the other end of the bag. The heat-sealing process can form bags with a lip as herein described, or can alternatively form bags that have a flattened top end and flattened bottom end to thereby provide the capability of stacking multiple bags neatly on top of one another.

To describe heat-sealing processes for certain embodiments more specifically, the polyethylene portion of the heat-sealable film 54 of the inner ply 51 at the bag ends 23, 25 can be heated to a melting point temperature of at least 220 degrees Fahrenheit to melt the heat-sealable polyethylene film of the bag ends 23, 25. Alternatively, the temperature could be raised in excess of 300 degrees Fahrenheit, in one embodiment for example, to melt not only portions of the polyethylene heat-sealable films 54 together but also to melt portions of the polyester films 33 together as well, thus advantageously forming an even tighter closed seal at the bag ends 23, 25. In one embodiment, for example, the manufacturer utilizing the heat-sealing bag machine will seal only one end 23, 25 portion of the bag 15, thereby leaving another end 23, 25 portion of the bag 15 open to eventually fill the bag 15 with food or other elements 19. The distributor of the goods, for example, then fills the bag 15 with the food or other elements 19, and thereafter seals the other end 23, 25 portion of the bag 15 after the bag 15 is full.

Embodiments of methods of assembling, positioning, using, and constructing a multi-layered bag 15 are also disclosed herein. The following discussion includes specific references to certain of such embodiments. The discussion is for illustrative purposes only, and should not be construed as limiting. Moreover, any suitable combination of the following disclosure with any portion of the foregoing disclosure is contemplated.

In certain embodiments, before any of the layers of a tube-forming material are bonded or adhered together, the method of constructing a bag 15 can include printing printed indicia 29 on the inner face of the grease-resistant film 33 of the outer ply 31 to advantageously enhance visual appearance of the bag 15. Also, before adhering the layers of film, the method can include clay-coating and bleaching the paper layer 35, and treating the paper layer 35 with a chemical to advantageously provide enhanced protection from grease penetrating through the paper layer 35 of the bag 15.

In certain embodiments, a method of constructing a bag 15 can include adhering an inner face of a grease-resistant polyester film 33 with an outer face of a paper layer 35 to create an outer ply 31. The method can also include adhering an inner face of a first film 53 to an outer face of a grease-resistant material 55 and adhering an inner face of the grease-resistant material 55 to an outer face of a second film 54 to create a multi-layer inner ply 51. The method can also include adhering an inner face of the outer ply 31 to an outer face of the inner ply 51 to create a laminate with a pair of opposing ends 23, 25. The method can also include overlying a portion of an inner face of the inner ply 51 located at one lateral side of the laminate onto a portion of an outer face of the outer ply 31 located at another lateral side of the laminate to define an overlapping seam extending along a longitudinal extent of a tubular portion of the bag. The method can also include adheringly overlying an end portion of at least one of the inner and outer plies 51, 31 of at least one of the opposing bag ends 23 onto another portion of the same bag end 23 with an adhesive 64 including components of rosin ester and ethylene vinyl acetate to define an overlapping seam substantially extending along a transverse extent of the same bag end 23 to thereby closingly seal the bag end 23.

In some embodiments, an inner face of the inner ply 51 of at least one of the opposing bag ends 23 is adhered to an outer face of the outer ply 31 of the same bag end 23 to define an overlapping seam substantially extending along a transverse extent of the bag end 23. The method can further include closingly sealing the overlapping seam responsive to the adhering to thereby prevent grease from penetrating from within the bag 15 to outside the bag 15 and prevent grease from penetrating from outside the bag 15 to within the bag 15.

The method can also include adhering an outer face of the outer ply 31 of at least one of the opposing bag ends 23 against the same outer face of the same outer ply 31 of the same bag end 23 to define an overlapping seam substantially extending along a transverse extent of the bag end 23. The method can further include closingly sealing the overlapping seam responsive to the adhering to thereby prevent grease from penetrating from within the bag 15 to outside the bag 15 and prevent grease from penetrating from outside the bag 15 to within the bag 15.

Certain embodiments of bags and methods herein disclosed can have important benefits and advantages. The combined use of polymeric structures and paper, for example, can combines the advantages of the thickness and bending stiffness of paper with the puncture-resistant and grease-resistant properties of polyester, including in some embodiments the heat-sealable characteristics of films such as polyethylene. Furthermore, the grease-resistant properties of the inner ply 51 offer enhanced grease-resistance in addition to the grease-resistance properties of the outer ply 31. Embodiments of a bag can provide increased barrier protections from grease, endurance, strength, physical integrity, and heat-sealable characteristics not offered with other bags. The bag 15 can advantageously prevent problems customarily associated with greasy products such as pet food, for example, and eliminate the absorption and penetrable effect of the grease component included in such foods as pet food. Various bags 15 are often used in other settings where greasy elements are contained within the bags 15, and embodiments of the bag advantageously contribute to solving such problematic concerns attributable to the grease. Other applications of the bag 15 may include dry foods, beverages, feed, soil, lawn and garden, building materials, and other markets to advantageously prevent grease from penetrating from outside the bag 15 to within the bag 15 and to prevent grease from penetrating from within the bag 15 to outside the bag 15. Furthermore, certain embodiments can offer enhanced strength to allow the bag to carry over twenty-five pounds of pet food with relative ease.

In some embodiments, materials used in constructing a bag can be environmentally friendly, in that the resulting bag is less toxic and increasingly biodegradable. Further, in some embodiments, a bag 15 can advantageously be manufactured on existing equipment, such that investment in new and expensive bag manufacturing equipment is unnecessary.

As discussed above, a variety of bag styles are possible. For example, in various embodiments, the bag 15 can comprise a gusseted pinch-bottom bag configuration, a non-gusseted pinch-bottom bag configuration, other various pinch-bottom bag configurations, and various block-bottom configurations.

FIGS. 21-23, which contain Tables 1-3, illustrate comparisons of different non-limiting, illustrative examples of an outer ply 31 and inner ply 51 construction, as compared with other materials, in such categories as stiffness, puncture resistance, tear resistance, and tear initiation. FIG. 24, which contains Table 4, illustrates raw data utilized in the calculations of tables 1-3 of FIGS. 21-23. The data from Table 4 of FIG. 24 includes properties of various materials and multi-layer combinations of materials. The raw data of Table 4 of FIG. 24 illustrate advantages that are possible with multi-layer combinations.

Many different grades and gauges for the PET, paper, and film are possible. Accordingly, FIGS. 21-24 merely provide non-limiting examples, and do not provide universal assertions with respect to any material listed. Rather, the tests provide an anecdotal indicator that fairly and adequately represents a benchmark of clear advantages that can result from a multi-layer combination, including, for example, enhanced stiffness, puncture resistance, tear resistance, and/or tear initiation.

Abbreviations are used in Tables 1-4. In particular, CSR4 (i.e., tradename CSR4) represents a type of fluorocarbon treated, clay coated, bleached sheet of paper; MWK represents a type of multi-wall Kraft (MWK) brown paper; Trial BL Non-CC represents type of fluorocarbon treated, bleached (BL) sheet of paper that is non-clay-coated (Non-CC); W-RPSE represents a type of Royal Performance semi-extensible (RPSE) white paper; Ad One (i.e., Advantage One) represents a type of substrate of a heavy extensible sheet of paper; 65# BL-MWK represents a bleached (BL) multi-wall Kraft (MWK) sheet of paper having a basis weight of 65 lbs; 48 gauge PET represents a PET layer of 48 gauge; and 2.5 mil. FT 2510 coextruded film represents a nylon coextruded core film having a 2.5 mil. gauge and a 2510 grade specification. Furthermore, in Tables 1-4 in FIGS. 21-23, references to paper correspond to the paper layer 35 of the outer ply 31, references to PET correspond to the outer layer 33 of the outer ply 31, and references to FT 2510 coextruded film correspond to the multi-layer or mono-layer formation of the inner ply 51.

FIG. 21 illustrates the percent increase in machine-direction tensile stiffness and cross-direction tensile stiffness, as these measurements are understood by those skilled in the art, for the following illustrative comparisons: 48 gauge PET, CSR4 paper, and 2.5 mil. FT 2510 coextruded film v. PET; 48 gauge PET, CSR4 paper, and 2.5 mil. FT 2510 coextruded film v. 2.5 mil. FT 2510 coextruded film; 48 gauge PET, Advantage One paper, and 2.5 mil. FT 2510 coextruded film v. PET; and 48 gauge PET, Advantage One paper, and 2.5 mil. FT 2510 coextruded film v. 2.5 mil. FT 2510 coextruded film. FIG. 22 illustrates the percent increase in dull-puncture and sharp-puncture, as these measurements are understood by those skilled in the art. FIG. 23 illustrates the percent increase in machine-direction tear resistance and cross-direction tear resistance, as these measurements are understood by those skilled in the art. FIG. 23 also shows the percent increase in machine-direction tear initiation and cross-direction tear initiation, as these measurements are understood by those skilled in the art. Each of the tables in FIGS. 21-23 illustrates data relating to the following illustrative comparisons: 48 gauge PET v. paper; and 48 gauge PET and 2.5 mil. FT 2510 coextruded film v. paper.

FIG. 25 depicts Table 5, which includes comparative measurements of a variety of bags. In particular, various properties are compared among a typical pet food bag (both the bag as a whole and an outer ply thereof), an illustrative, non-limiting embodiment of a composite bag (e.g., a bag comprising a multi-layered construction), a 100% polyolefin bag, and a common woven polypropylene sewn-open-mouth bag. The typical pet food bag represented in the first row of data in Table 5 comprises a construction having a CSR4 outer ply (a bleached 41 pound per 3,000 square feet clay-coated grease-resistant treated paper), two plies of multiwall kraft, and 2 plies of 0.75 mil BOPP film liner. The second row of data in Table 5 represents measurements related to the CSR4 outer ply of the typical pet food bag (i.e., the pet food bag represented in the first row of data). In particular, the label "Failure-Current" represents a stage at which the outer ply has ripped or torn. In certain of such instances, the entire package can be considered a failure at the "Failure-Current" state, even though remaining plies of the package have not failed, since consumers are less likely to purchase the package due to visible damage to the package. The composite bag represented in the third row of data in Table 5 comprises a 48 gauge PET layer, a 50 pound bleached extensible paper layer, and a 3 mil coextruded film inner ply. The typical woven polypropylene bag represented in the fifth row of data in Table 5 includes a 0.75 mil BOPP extrusion laminated to 850 denier weave having an 8×10 thread count that is coated with 1.0 mil PE; the extrudate is a PP copolymer having a thickness of 1.0 mil.

The tests performed on the various bags are listed in the first row of Table 5. It is noted that the abbreviation "MD" is used to denote "Machine Direction," and the abbreviation "CD" is used to denote "Cross Direction." For the examples shown, dull probe puncture resistance was measured in accordance with test method ASTM D5748, tear resistance was measured in accordance with test method TAPPI T414, tear initiation was measured in accordance with test method ASTM D1004-07, tensile, elongation was measured in accordance with test method TAPPI T494, and taber stiffness was measured in accordance with test method ASTM D5748.

As shown in FIG. 26, other tests can be performed to compare embodiments of composite bags with other bag varieties. For example, it can be desirable to compare the results of drop tests to determine the relative durability of the composite bag as compared with other bag varieties. One suitable drop test can be performed in accordance with test method ASTM D 5276 and/or test method TAPPI UM 806. The foregoing tests can also be altered or augmented. In some instances, the drop test can comprise a 6-stage cycle, with each stage comprising dropping the bag from a height of 4 feet. The 6 stages of the cycle can comprise separately dropping the bag on its front, back, left edge, right edge, top, and bottom. In some instances, testing can be stopped after three full dropping cycles (i.e., after 18 total drops of the bag). Drop test results can depend on the bag design style (e.g., SOM vs. pinch) and upon the filled weight of the bag.

The typical pet food bag represented in the first and third rows of data in Table 6 comprises a construction having a CSR4 outer ply (a bleached 41 pound per 3,000 square feet clay-coated grease-resistant treated paper), two plies of 50 pound multiwall kraft, and one ply of 1.25 mil BOPP. For the first row of data, the pet food bag is formed with a pinched bottom seal and a pinched top seal; for the third row of data, the pet food bag comprises a sewn-open-mouth configuration. The composite bag represented in the second and fifth rows of data in Table 6 comprises a 48 gauge PET layer, a 50 pound bleached extensible paper layer, and a 3 mil coextruded film inner ply. For the second row of data, the composite bag is formed with a pinched bottom seal and a pinched top seal; for the fifth row of data, the composite bag comprises a sewn-open-mouth configuration. The typical woven polypropylene bag represented in the fourth row of data in Table 6 includes a 0.75 mil BOPP extrusion laminated to 850 denier weave having an 8×10 thread count that is coated with 1.0 mil PE; the extrudate is a PP copolymer having a thickness of 1.0 mil.

As shown in Table 6, in some cases, a typical pinch-bottom/pinch-top pet food bag filled with 20 pounds of pet food and subjected to the conditions of a test such as described above can experience more than 18 drops before failing. However, in other cases, a typical pinch-bottom/pinch-top pet food bag can average about 15 drops before reaching a Failure-Current state, which is often the result of gusset failures and outer ply failures. When the pinch-construction pet food bag is filled with 52 pounds of pet food, it can average about 5 drops before failing.

The composite bag of the present example, which has a pinch-bottom/pinch-top configuration and is filled with 20 pounds of pet food can experience more than 18 drops before failing. In contrast to the typical pet food bag, the composite bag of the present example generally is not prone to gusset failures or outer ply failures due to its laminated structure and the strength of the materials it contains. When filled with 52 pounds of pet food, the composite bag can average about 7.5 drops before failing. Often, the mode of failure in such instances is a failure of a back seam that runs along the longitudinal length of the bag (e.g., the seam 75).

A typical sealed-open-mouth pet food bag subjected to the testing conditions can experience 9.1 drops before failing, and a composite sealed-open-mouth pet food bag subjected to the testing conditions can experience 9.2 drops before failing.

Various differences between the specific embodiment of a composite bag used in the tests and each of the other bags are evident from Table 5. For example, as compared with a typical pet food bag that is tested in its entirety (i.e., the first row of data in Table 5), the composite bag used in this particular test is more lightweight, more puncture-resistant, more tear-resistant, slightly less resistant to tear initiation, exhibits greater tensile strength, is stretchier, and is less stiff in a machine direction but stiffer in a cross direction. As compared with typical pet food bag that is tested to the "Failure-Current" state described above (i.e., the second row of data in Table 5), the composite bag is significantly more puncture resistant, more tear resistant, and less prone to tearing. Additionally, as is apparent from the drop test results, the composite bag can be considered to have superior overall strength and to hold up better under typical product handling conditions.

As shown in Table 6, a typical sewn-open-mouth pet food bag filled with 52 pounds of pet food can fail after only 3 drops. The typical woven polypropylene bag and the composite bag of the present example each can be more durable than the typical pet food bag, each failing after about 9.2 drops on average. In many instances, the woven polypropylene and composite bags fail due to ruptures of the sewing line.

The foregoing examples should not be interpreted as limiting. For example, many embodiments of a composite bag can have measurements that are different from those listed in Tables 5 and 6. To illustrate, in various embodiments, a composite bag can have a dull probe puncture resistance within a range of from about 5,000 grams to about 8,000 grams, a machine-direction tear resistance within a range of from about 2,000 grams to about 4,000 grams, a cross-direction resistance within a range of from about 3,000 grams to about 6,000 grams, a machine-direction tear initiation within a range of from about 1,000 grams to about 3,000 grams, a cross-direction tear initiation within a range of from about 1,000 grams to about 3,000 grams, a machine-direction tensile strength within a range of from about 30 pounds per inch to about 50 pounds per inch, a machine-direction stretch within a range of from about 3% to about 15%, a cross-direction tensile strength within a range of from about 15 pounds per inch to about 30 pounds per inch, a cross-direction stretch within a range of from about 5% to about 15%, a machine-direction taber stiffness within a range of from about 2.5 to about 5.0, and/or a cross-direction taber stiffness within a range of from about 3.0 to about 7.0. Any subset of the foregoing ranges is possible, and values outside of the listed ranges are also possible.

Non-limiting examples compatible with certain embodiments described herein are now provided. The examples are given by way of illustration, and are not intended to limit the disclosure herein.

Example 1

In certain embodiments, a material for forming a bag 15 is laminated on an in-line tuber. Specifically, an approximately 48 gauge PET layer (e.g., film 33) is reverse printed and laminated to bleached 35 lb. paper (e.g., paper layer 35), which in turn is laminated to a 5-layer co-extruded film (e.g., inner ply 51) that contains a nylon core (e.g., core layer 55). The 35 lb. paper and 5-layer co-extruded film are laminated to each other via solventless adhesive. For material that is used in bags that are configured to contain about 20 or more kilograms of product, the thickness of the co-extruded film is about 4 mils. For material that is used in bags that are configured to contain less than about 20 kilograms of product, the thickness of the co-extruded film is about 3 mils. The multi-layer, laminated material is then converted to bags on standard converting equipment.

Bags formed in the foregoing manner can demonstrate excellent grease resistance, odor resistance, and pest resistance. In some embodiments, bags that contain a food product having a fat content of less than 10% by weight exhibit no grease leakage from a sewn closure (e.g., neither through a sealed end of the bag nor through openings in the bag walls through which a stitching element extends) after three months of storage in an environment at about 130 degrees Fahrenheit. The bags can exhibit substantially no odor leaks under the same conditions.

In some embodiments, bags that contain a food product having a fat content of less than 10% by weight exhibit no grease leakage from a sewn closure after nine months of storage in an environment at room temperature. The bags can exhibit substantially no odor leaks under the same conditions.

In some embodiments, bags that contain a food product having a fat content of at least about 15% by weight exhibit no grease leakage from a sewn closure after 30 days of storage in an environment at about 130 degrees Fahrenheit.

Example 2

In certain embodiments, a material for forming a bag 15 is laminated on an in-line tuber. Specifically, an approximately 48 gauge PET layer is reverse printed and laminated to 50 pound bleached extensible paper, which in turn is laminated to a 5-layer co-extruded film that contains a nylon core. The 50 pound paper and 5-layer co-extruded film are laminated to each other via solventless adhesive. For material that is used in bags that are configured to contain about 20 or more kilograms of product, the thickness of the co-extruded film is about 4 mils. For material that is used in bags that are configured to contain less than about 20 kilograms of product (e.g., between about 2 kg and about 10 kg), the thickness of the co-extruded film is about 2 mils. The multi-layer, laminated material is then converted to bags on standard converting equipment. Bags formed in the foregoing manner can demonstrate grease and odor resistance such as that described above with respect to Example 1.

Various modifications, changes, and variations apparent to those of skill in the art may be made in the arrangement, operation, and details of the apparatus and methods detailed in the disclosure without departing from the spirit and scope of the disclosure. Thus, it is to be understood that the embodiments described above have been presented by way of example, and not limitation. Any suitable combination of the features described above is contemplated. Moreover, each embodiment recited in the claims that follow is incorporated herein as a separate embodiment.

The invention claimed is:

1. A method of manufacturing a bag, the method comprising:
    attaching a polyamide film to a first side of a paper layer so that the polyamide film and the paper layer are abuttingly joined to each other and so as to form a barrier relative to the paper that is capable of preventing the passage of grease and solvents therethrough;
    forming the polyamide film and the paper layer into a tube body having a first end, a second end, a front wall, and a back wall, wherein the polyamide film is exterior to the paper layer;
    introducing a stitching element into openings in the front wall and the back wall of the tube body to thereby form a substantially grease-impermeable seal at the first end of the tube body; and
    forming substantially grease-impermeable seals between the stitching element and the openings in the front wall and the back wall of the tube body.

2. The method of claim 1, further comprising attaching a grease-resistant ply in abutting contact to a second side of the paper layer that is opposite the first side of the paper layer.

3. The method of claim 2, wherein a thickness of the grease-resistant ply is between about 0.5 mils and about 6.0 mils.

4. The method of claim 2, wherein the grease-resistant ply comprises polyethylene.

5. The method of claim 1, wherein attaching the polyamide film to the first side of a paper layer comprises positioning a water-based adhesive between the polyamide film and the paper layer.

6. A bag comprising:
    a tube body that defines a front wall and a back wall, wherein the tube body comprises:
        a polyamide layer that defines a barrier capable of preventing the passage of grease and solvents therethrough; and
        a paper layer abuttingly joined to at an interior surface of the polyamide layer; and
    a stitching element providing a substantially grease-impermeable seal between the front wall and the back wall at a first end of the tube body, wherein the stitching element extends through a first opening in the front wall that passes through the polyamide and paper layers and a second opening in the back wall that passes through the polyamide and paper layers,
    wherein the front wall interacts with the stitching element at the first opening to substantially prevent grease from entering or exiting the tube body via the first opening, and the back wall interacts with the stitching element at the second opening to substantially prevent grease from entering or exiting the tube body via the second opening.

7. The bag of claim 6, wherein the tube body further defines a first sidewall and a second sidewall that extend between the front wall and the back wall, and wherein at least the first sidewall defines a third opening and a fourth opening through which the stitching element extends.

8. The bag of claim 6, wherein the substantially grease-impermeable seal between the front wall and the back wall extends substantially across a full transverse width of the tube body.

9. The bag of claim 6, wherein a second end of the tube body comprises a resealable zipper closure.

10. The bag of claim 6, wherein the tube body further comprises a grease-resistant ply abuttingly joined to an inner surface of the paper layer.

11. The bag of claim 10, wherein the grease-resistant ply comprises polyethylene.

12. The bag of claim 10, wherein at least a portion of the grease-resistant ply is heat-sealable.

13. The bag of claim 12, wherein the grease-resistant ply comprises one or more of heat-sealable polyethylene and biaxially oriented polypropylene.

14. The bag of claim 10, wherein a thickness of the grease-resistant ply is between about 0.5 mils and about 6.0 mils.

15. The bag of claim 6, wherein the polyamide layer is resilient such that the polyamide layer is configured to close around the stitching element to form a substantially grease-proof seal therewith.

16. The bag of claim 6, wherein the paper layer is abuttingly joined to the interior surface of the polyamide layer via an adhesive.

17. The bag of claim 16, wherein the adhesive is water-based.

18. The bag of claim 6, wherein the polyamide layer is laminated to the paper layer.

19. A bag comprising:
a tube body formed from a material that comprises a polyamide film and a paper layer abuttingly joined to an inwardly facing surface of the polyamide film, wherein the tube body defines a front wall and a back wall, and wherein the polyamide film defines a barrier capable of preventing the passage of grease and solvents therethrough; and
a stitching element that extends through both the front wall and the back wall, wherein the polyamide film of the front wall interacts with the stitching element to form a seal that is configured to substantially prevent passage of grease, and wherein the polyamide film of the back wall interacts with the stitching element to form a seal that is configured to substantially prevent passage of grease.

20. The bag of claim 19, wherein the seal formed by the polyamide film of the front wall is configured to substantially prevent passage of odor.

21. The bag of claim 19, wherein the tube body further defines a first sidewall and a second sidewall that extend between the front wall and the back wall, wherein the stitching element extends through the first sidewall, and wherein the polyamide film interacts with the stitching element to form a seal that is configured to substantially prevent passage of grease.

22. The bag of claim 19, wherein the stitching element cooperates with the tube body to form a substantially grease-impermeable seal at the first end of the tube body that extends substantially across a full transverse width of the tube body.

23. The bag of claim 19, wherein a second end of the tube body comprises a resealable zipper closure.

24. The bag of claim 19, wherein the tube body further comprises a grease-resistant ply abuttingly joined to an inner surface of the paper layer.

25. The bag of claim 24, wherein the grease-resistant ply comprises polyethylene.

26. The bag of claim 25, wherein at least a portion of the grease-resistant ply is heat-sealable.

27. The bag of claim 26, wherein the grease-resistant ply comprises one or more of heat-sealable polyethylene and biaxially oriented polypropylene.

28. The bag of claim 24, wherein a thickness of the grease-resistant ply is between about 0.5 mils and about 6.0 mils.

29. The bag of claim 19, wherein the paper layer is abuttingly joined to the interior surface of the polyamide layer via an adhesive.

30. The bag of claim 29, wherein the adhesive is water-based.

31. The bag of claim 19, wherein the paper layer is laminated to the polyamide film.

* * * * *